United States Patent
Mori et al.

(10) Patent No.: US 9,134,499 B2
(45) Date of Patent: Sep. 15, 2015

(54) IMAGE PICKUP LENS UNIT MANUFACTURING METHOD AND IMAGE PICKUP LENS UNIT

(75) Inventors: Hajime Mori, Fuchu (JP); Takashi Fujii, Hachioji (JP); Takemi Miyazaki, Hamura (JP)

(73) Assignee: KONICA MINOLTA, INC., Tokyo (JP)

( * ) Notice: Subject to any disclaimer, the term of this patent is extended or adjusted under 35 U.S.C. 154(b) by 154 days.

(21) Appl. No.: 13/825,288

(22) PCT Filed: Sep. 9, 2011

(86) PCT No.: PCT/JP2011/070630
§ 371 (c)(1),
(2), (4) Date: Jun. 19, 2013

(87) PCT Pub. No.: WO2012/039303
PCT Pub. Date: Mar. 29, 2012

(65) Prior Publication Data
US 2013/0271859 A1    Oct. 17, 2013

(30) Foreign Application Priority Data

Sep. 22, 2010   (JP) .................................. 2010-212901
Sep. 30, 2010   (JP) .................................. 2010-223142

(51) Int. Cl.
*G02B 7/02*       (2006.01)
*B29C 45/14*      (2006.01)
*G02B 19/00*      (2006.01)

(52) U.S. Cl.
CPC ............ *G02B 7/02* (2013.01); *B29C 45/14065* (2013.01); *G02B 19/0076* (2013.01); *B29C 2045/14122* (2013.01)

(58) Field of Classification Search
CPC .. G02B 15/14; G02B 13/0045; G02B 27/646; G02B 7/02; B29C 45/1671; B29C 2045/1673; B29D 11/0073; B29D 11/023
USPC .................................... 359/819, 811; 264/2.7
See application file for complete search history.

(56) References Cited

U.S. PATENT DOCUMENTS

2008/0278621 A1* 11/2008 Cho et al. ...................... 348/374

FOREIGN PATENT DOCUMENTS

| JP | 50-14126 | 5/1975 |
| JP | 59-118517 | 8/1984 |

(Continued)

OTHER PUBLICATIONS

English translation of the Japanese document (JP 2006-208675 A).*

(Continued)

*Primary Examiner* — Scott J Sugarman
*Assistant Examiner* — Ephrem Mebrahtu
(74) *Attorney, Agent, or Firm* — Lucas & Mercanti, LLP

(57) ABSTRACT

An object is to provide a method for manufacturing an image pickup lens unit which can form a holder member with a small number of components, and can avoid generation or a ghost or flare caused by a positioning shape, an appearance problem, deterioration of dimension accuracy. In an installing step, since a lens 10 is positioned by one pressing member (protrusion) 61*d* of protrusions 61*d* and 62*d* which are a pair of pressing members disposed in a position corresponding to a pair of openings OP1 and OP2 by molds 51 and 52, it is possible to reliably fix the lens 10 in the molds 51 and 52 in a state of not affecting to a shape of a holder member 40 without interrupting the molding of the holder member 40. Thus, it is possible to avoid deterioration of the dimension accuracy due to the remaining large positioning shape on the holder member 40. In addition, since the holder member 40 is integrally molded, it is possible to avoid an increase of the number of components used for the assembling the holder or complicated component shapes of a connecting portion.

36 Claims, 26 Drawing Sheets

(56) References Cited

FOREIGN PATENT DOCUMENTS

| JP | 63-57213 | | | 3/1988 |
|---|---|---|---|---|
| JP | 1-317734 | | | 12/1989 |
| JP | 3019804 | | | 10/1995 |
| JP | 2004-66773 | | | 3/2004 |
| JP | 2004066773 | A | * | 3/2004 |
| JP | 2004-98547 | | | 4/2004 |
| JP | 2006208675 | A | * | 8/2006 |
| JP | 2006-341412 | | | 12/2006 |
| JP | 2007-313767 | | | 12/2007 |
| JP | 2008-155577 | | | 7/2008 |
| JP | 2008155577 | A | * | 7/2008 |
| JP | 2008-221565 | | | 9/2008 |
| JP | 2009-53530 | | | 3/2009 |
| JP | 2009-242456 | | | 10/2009 |
| JP | 2009-300626 | | | 12/2009 |
| JP | 2009300626 | A | * | 12/2009 |

OTHER PUBLICATIONS

English translation of the Japanese document (JP 2008-155577).*
English translation of the Japanese document (JP 2004-066773).*
English translation of the Japanese document (JP 2009-300626).*
English Language International Search Report from the Japanese Patent Office, mailed Nov. 29, 2011, for International Application No. PCT/JP2011/070630.
English-language international Search Report from the Japanese Patent Office, mailed Nov. 29, 2011, for International Application No. PCT/JP2011/070630.
English translation of International Preliminary Report on Patentability from the International Bureau of WIPO in corresponding PCT international Application No. PCT/JP2011/070630 mailed Apr. 16, 2013.
Office Action dated Apr. 14, 2015 issued for the corresponding Japanese Patent Application No. 2012-534996.
Partial English translation of Office Action dated Apr. 14, 2015 issued for the corresponding Japanese Patent Application No. 2012-534996.

* cited by examiner

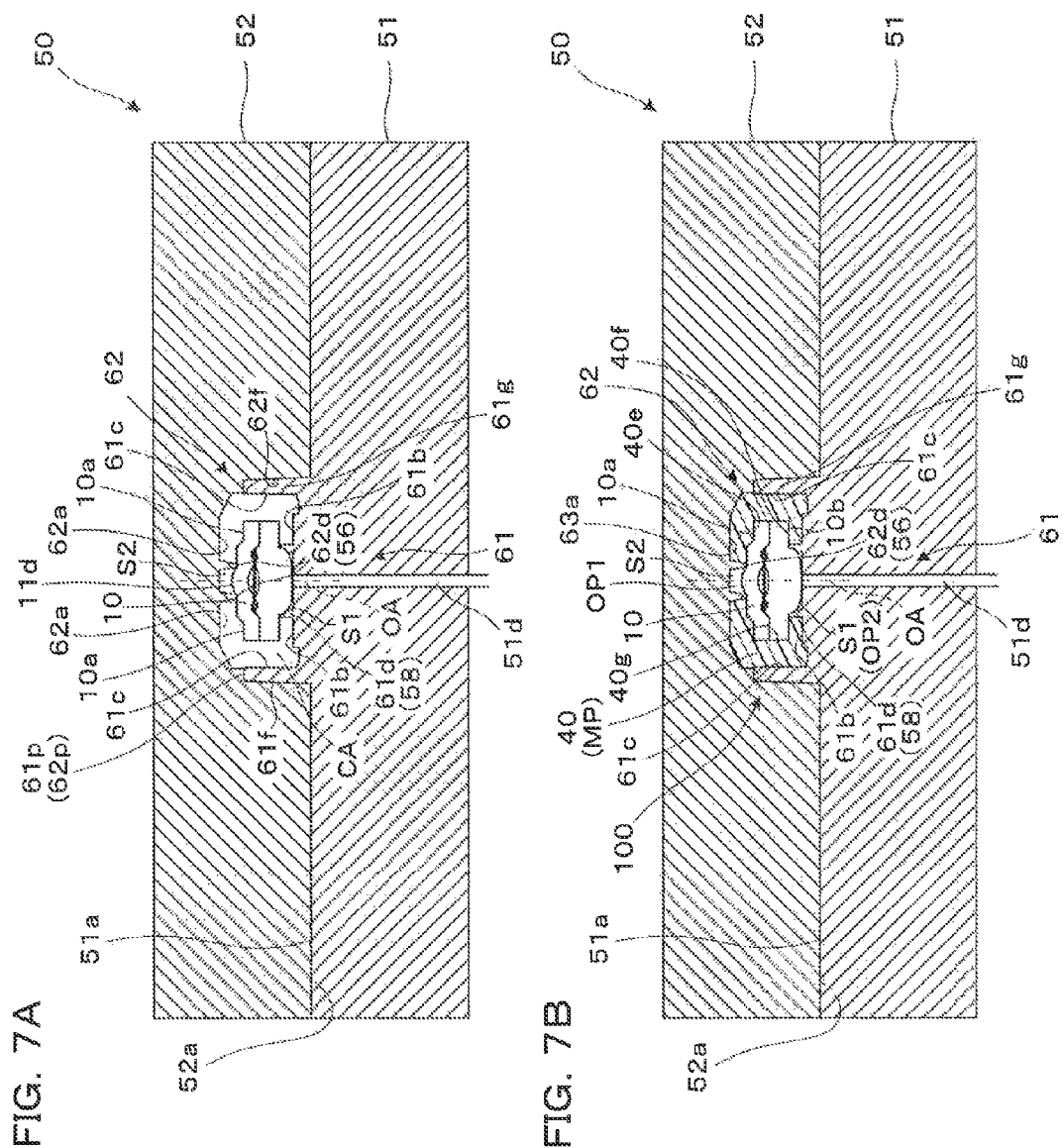

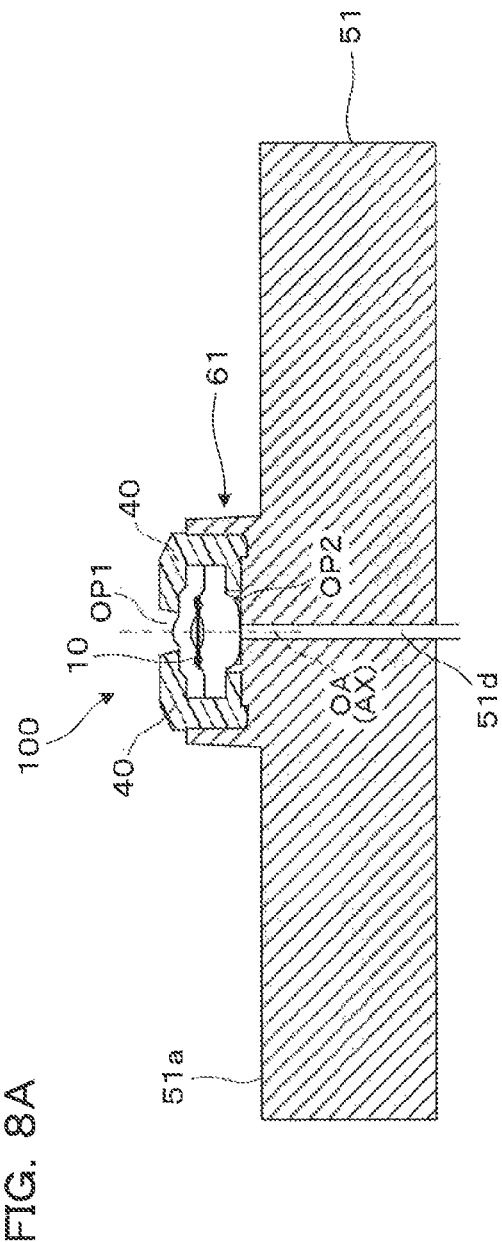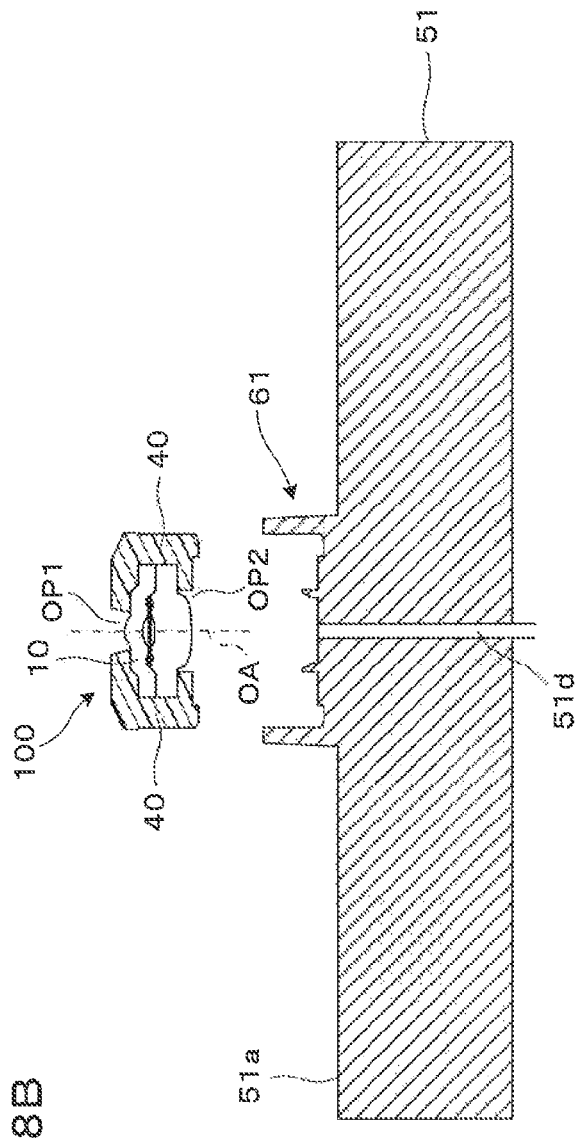

IMAGE PICKUP LENS UNIT MANUFACTURING METHOD AND IMAGE PICKUP LENS UNIT

CROSS-REFERENCE TO RELATED APPLICATIONS

This application is a 371 of International Application No. PCT/JP2011/070630, filed Sep. 9, 2011, which claims the benefit of priority of Japanese Patent Application Nos. JP 2010-223142, filed Sep. 30, 2010, and JP 2010-212901, filed Sep. 22, 2010.

TECHNICAL FIELD

The present invention relates to a method for manufacturing an image pickup lens unit having a lens mounted in a holder, and also relates to the image pickup lens unit.

BACKGROUND ART

An image pickup lens unit included in mobile phones has a structure in which a periphery of an optical lens for imaging is held by a holder. Typically, the optical lens is mounted into the holder by an automatic assembly system that has a very high positioning accuracy and uses an image recognition technique. However, such a system is not only very costly, but also requires a very large space because production lines are set up for different steps, such as a step of inserting a lens into a holder and a step of bonding the lens to the holder. As a result, facility replacement carried out for each change of lens type involves very extensive work, and hence many worker-hours are required.

A manufacturing method that addresses the problems described above is known. In this method, after an optical glass lens and a stop (or diaphragm) are positioned and set in a mold in advance, a holder is formed around the optical glass lens by injection molding to assemble an image pickup lens unit at the same time (see PTL 2).

In the manufacturing method described in PLT1, by setting the lens and the stop with a positioning member which is formed in the mold so as to extend along a side surface of the lens and the stop, the positioning is performed with respect to the mold. Accordingly, an operation of the positioning between the holder and the lens is not necessary and it is possible to reduce the number of components. However, since a positioning shape which is generated when the positioning is performed by abutting the optical lens or the stop before molding, remains as a deep hollow on a portion of a molded product facing the side surface of the optical lens or the like, optical problems such as a ghost or flare caused by unnecessary light in the position thereof can be generated. Also, visual specifications required for the image-pickup lens unit to be included in products, such as image-pickup apparatuses, may not be met. In addition, it is not possible to manufacture a small image pickup lens unit which is required for an image pickup lens unit built in a portable device, for example, a mobile, phone. Also, such a positioning shape may cause deformation during mold releasing and may deteriorate the dimensional accuracy. Further, in the above method for manufacturing, since the optical glass lens or the like is positioned and fixed by holding the optical glass lens between molds, there is a concern of damaging the optical glass lens at the time of the fixing.

CITATION LIST

Patent Literature

PTL 1: Japanese Patent Application Publication No. 2009-300626

SUMMARY OF INVENTION

An object of the present invention is to provide a method for manufacturing an image pickup lens unit in which an operation of positioning a holder and a lens is not needed, a holder member can be formed with a small number of components, the image pickup lens unit can be made small in size, and it is possible to avoid the occurrence of ghosts and flares, visual defects, and deterioration of dimensional accuracy caused by the presence of a positioning shape.

In addition, the present invention is to provide a method for manufacturing an image pickup lens unit in which damage to a lens when setting the lens in a mold can be prevented.

Further, the present invention is to provide an image pickup lens unit which is composed of a small number of components, and in which it is possible to easily avoid the occurrence of ghosts and flares, visual defects, and deterioration of dimensional accuracy.

For solving the above problems, there is a first method for manufacturing an image pickup lens unit according to the present invention including a lens which has a first surface forming a first optical surface and a second surface a second optical surface on the opposite side to the first surface, and a holder member which is integrally molded for holding the lens in the inner portion in a state where the first and second optical surfaces are exposed, the method comprising: disposing the lens in a mold having a molding space for molding the holder member; performing positioning of the lens with respect to the mold in which a positioning member is provided so as to be in contact with the second surface of the lens by bringing the positioning member into contact with a bending part of the second surface of the lens; fixing the lens with respect to the mold; and molding the holder member which holds the lens in the inner portion by filling the molding space of the mold with a resin and solidifying, in a state where the lens is positioned and fixed with respect to the mold.

According to the first method for manufacturing, since the positioning is performed by bringing the positioning member of the mold into contact with the second surface of the lens, it is possible to mold the holder member in a state of not affecting to a shape of the holder member without interrupting the molding of the holder member. Accordingly, it is possible to avoid generation of optical problems such as a ghost or flare, dissatisfaction of a required appearance, or deterioration of dimension accuracy due to the remaining a large positioning shape on the holder member. In addition, since the holder member is integrally molded in a state of fixing the lens, it is possible to reliably perform molding and fixing of the holder member collectively, and to avoid an increase of the number of components used for the assembling the holder, and it is not necessary to configure the holder member by joining the plurality of components to each other.

In the detailed aspect of the present invention, in the first method for manufacturing, the second surface of the lens provides an inclined surface in the outer side with respect to the second optical surface, and the positioning member includes a contact surface facing the inclined surface provided on the second surface of the lens. In this case, it is possible to reliably perform positioning with a simple configuration.

In another aspect of the present invention, the positioning member has a circular shape. In this case, the resin for forming the holder member is obstructed by the circular shaped positioning member and can be prevent from leaking out toward the side of the optical surface of the lens.

In still another aspect of the present invention, the lens is fixed by pressing the first surface of the lens by a pressing member provided in the mold so as to be in contact with the first surface of the lens. In this case, it is possible to reliably fix the positioned lens.

In still another aspect of the present invention, the positioning of the lens with respect to the mold is performed by bringing the pressing member into contact with the bending part of the first surface of the lens. In this case, it is possible to more reliably perform positioning from both surfaces of the lens. In addition, by setting the pressing member in a circular shape, even in the first surface of the lens, the resin for forming the holder member is obstructed by the pressing member and can be prevent from leaking out toward the side of the optical surface of the lens.

In another aspect of the present invention, one of the positioning member and the pressing member includes a contact surface which faces an inclined surface being formed into the peripheral part next to one of the first and second optical surfaces of the lens, and the other one of the positioning member and the pressing member includes a contact surface which faces the other one of the first and second optical surfaces of the lens and has substantially the same shape as the first or the second optical surface.

For solving the above problems, there is a second method for manufacturing an image pickup lens unit according to the present invention including a lens which has a first surface forming a first optical surface and a second surface forming a second optical surface on the opposite side to the first surface, and a holder member is which integrally molded for holding the lens in the inner portion in a state where the first and second optical surfaces are exposed, the method comprising: disposing the lens in a mold having a molding space for molding the holder member; performing positioning of the lens with respect to the mold in which a positioning member is provided so as to be in contact with the second surface of the lens by bringing the positioning member into contact with a bending part of the second surface of the lens; bringing the lens and the mold into contact by an elastic biasing force, when fixing the lens with respect to the mold; and molding the holder member which holds the lens in the inner portion by filling the molding space of the mold with a resin and solidifying it, in a state where the lens is positioned and fixed with respect to the mold.

According to the second method for manufacturing, since the positioning is performed by bringing the positioning member of the mold into contact with the second surface of the lens, it is possible to mold the holder member in a state of not affecting to a shape of the holder member without interrupting the molding of the holder member. Accordingly, it is possible to avoid generation of optical problems such as a ghost or flare, dissatisfaction of a required appearance, or deterioration of dimension accuracy due to the remaining a large positioning shape on the holder member. In addition, since the holder member is integrally molded in a state of fixing the lens, it is possible to reliably perform molding and fixing of the holder member collectively, and to avoid an increase in the number of components used for the assembling the holder, and it is not necessary to configure the holder member by joining the plurality of components to each other.

Further, according to the second method for manufacturing, since the lens and the mold are brought into contact each other by an elastic biasing force when fixing the lens with respect to the mold, the on the lens can be controlled reducing the breakage and deformation or the like of the lens.

In the detailed aspect of the present invention, in the second method for manufacturing, a pressing member which presses the first surface of the lens is provided in the mold, and at least one of the positioning member and the pressing member is configured to be displaced elastically with respect to a main body of the mold. In this case, the positioning member or the pressing member can be displaced elastically at the time of fixing, and the impact on the lens at the time of fixing can be controlled.

In still another aspect of the present invention, a pressing member which presses the first surface of the lens is provided in the mold, and at least one of the positioning member and the pressing member includes an elastic member configured to come into contact with at least a part of the first and second surfaces and undergo elastic deformation. In this case, by the elastic member that is in direct contact with the first or second surface, the impact on the lens at the time of fixing can be controlled.

In still another aspect of the present invention, a pressing member which presses the first surface of the lens is provided in the mold, at least one of the positioning member and the pressing member includes the elastic member which comes into contact with the first or second optical surface. In this case, by the elastic member that is in direct contact with the first or second optical surface, the impact on the lens at the time of fixing can be controlled.

In still another aspect of the present invention, a pressing member which presses the first surface of the lens is provided in the mold, and at least one of the positioning member and the pressing member supports the first or second surface through a surface protection layer configured to coat (cover) at least a part of the first and second surfaces and undergo elastic deformation. In this case, by the surface protection layer interposed between the pressing member or the pressing member, and the first or second surface, the impact on the lens at the time of fixing can be controlled.

In still another aspect of the present invention, at least a part of the lens is formed by an elastic material configured to undergo elastic deformation, and the positioning member supports at least one of the second optical surface and a remaining surface region except the second optical surface form the second surface. In this case, by providing elasticity to the lens being fixed, the breakage or deformation or the like of the lens can be reduced.

In still another aspect of the present invention, at least a part of the lens is formed by an elastic material which is elastically deformable, and a pressing member which presses the first surface of the lens is provided in the mold, and the pressing member supports at least one of the first optical surface and a remaining surface region except the first optical surface from the first surface. In this case, by providing elasticity to the lens being fixed, the breakage or deformation or the like of the lens can be reduced.

In still another aspect of the present invention, the first or second surface is supported by a contact surface having substantially the same shape. In this case, the resin for forming the holder member is obstructed by the positioning member or the pressing member and can be prevent from leaking out toward the side of the optical surface of the lens.

In still another aspect of the present invention, the positioning member includes a contact surface facing an inclined portion other than an effective region in the second optical surface of the lens. In this case, since it is possible to perform positioning using the lens shape, it is not necessary to add the shape for positioning to the lens and it is possible to reliably perform positioning with a simpler configuration.

In still another aspect of the present invention, the positioning member includes a contact surface which faces the second optical surface of the lens and has substantially the same shape as the second optical surface. In this case, the resin for forming the holder member is obstructed by the positioning member and can be prevent from leaking out toward the side of the optical surface of the lens.

In still another aspect of the present invention, in the first and second methods of manufacturing, the positioning member includes a contact surface facing an inclined portion other than an effective region in the second optical surface of the lens. In this case, since it is possible to perform positioning using the lens shape, it is not necessary to add the shape for positioning to the lens and it is possible to reliably perform positioning with a simpler configuration.

In still another aspect of the present invention, the positioning member includes a contact surface which faces the second optical surface of the lens and has substantially the same shape as the second optical surface. In this case, the resin for forming the holder member is obstructed by the positioning member and can be prevent from leaking out toward the side of the optical surface of the lens.

In still another aspect of the present invention, the lens is a single lens component, or a lens assembly which is an integrated combination of a plurality of lens elements. In this case, the step of inserting and positioning the lens in the holder member becomes simple.

In still another aspect of the present invention, the lens assembly is an integrated combination of a plurality lens elements and a stop interposed between the plurality of lens elements. In this case, the step of inserting and positioning the lens in the holder member becomes simple.

In still another aspect of the present invention, the lens has quadrilateral prism-like side surfaces. In this case, individual lens elements can be easily cut out and used from a wafer-shaped base material in which plurality of lenses are collectively formed.

In still another aspect of the present invention, a molding space for molding the lens is provided at a position different from the molding space for molding the holder member, in the mold. In this case, the space required for the device for manufacturing the image pickup lens unit can be saved.

In still another aspect of the present invention, the holder member and the lens are formed with a reflow heat-resistant material. In this case, the image pickup lens unit having heat resistance can be processed in a reflow step.

In still another aspect of the present invention, movement of the lens is prevented by sucking the lens from the mold side in a state of positioning the lens by the positioning member. In this case, it is possible to fix steadily the lens disposed in the mold when molding, and to further improve accuracy of molding.

In still another aspect of the present invention, the pressing of the lens is performed by the pressing member after performing the positioning of the lens by the positioning member.

In still another aspect of the present invention, the positioning of the lens with respect to the mold is performed by bringing the positioning member in contact with a bending part of the second surface of the lens and pressing the positioning member towards the lens, in a state of bringing the first surface of the lens in contact with the pressing member.

For solving the above problems, an image pickup lens unit according to the present invention includes a lens including a first surface which forms a first optical surface, and a second surface which forms a second optical surface on the opposite side to the first surface; and a holder member which holds the lens in the inner portion in a state where the first and second optical surfaces are exposed, wherein the holder member is formed by integral molding, and come into intimate contact with the lens in the entire side surface of the lens, an edge portion of the first surface of the lens and an edge portion of the second surface of the lens.

According to the image pickup lens unit, the holder member is come into intimate contact with the entire side surface of the lens, first surface, and the second surface, and it is possible to reliably stabilize the holding of the lens. In addition, since the holder member is an integral molded item, it is possible to avoid an increase of the number of components used for the assembling the holder and it is not necessary to configure the holder member by joining the plurality of components to each other.

In the detailed aspect of the present invention, in the image pickup lens unit, the holder member surrounds the periphery or vicinity of the first optical surface of the lens in a circular shape. Alternatively, the holder member surrounds the periphery or vicinity of the second optical surface of the lens in a circular shape. In both cases, it is possible to for the holder member to realize a function of light shielding of the periphery of the lens. In addition, it is possible to further reliably perform the holding of the lens.

In another aspect of the present invention, the lens is formed of a resin material.

In still another aspect of the present invention, the lens is welded to the holder member. In this case, it is possible to further reliably perform the holding of the lens.

BRIEF DESCRIPTION OF DRAWINGS

FIG. 7(A) is a cross-sectional view for explaining the formation of a cavity in the manufacturing apparatus, and FIG. 7(B) is a cross-sectional view for explaining the molding of a holder member.

FIG. 8(A) is a cross-sectional view for explaining the mold opening in the manufacturing apparatus, and FIG. 8(B) is a cross-sectional view for explaining the extraction of the image pickup lens unit.

DESCRIPTION OF EMBODIMENTS

First Embodiment

In the following, a structure of an image pickup lens unit and a method for manufacturing thereof according to a first embodiment of the present invention will be described with reference to the drawings.

Figure 1:
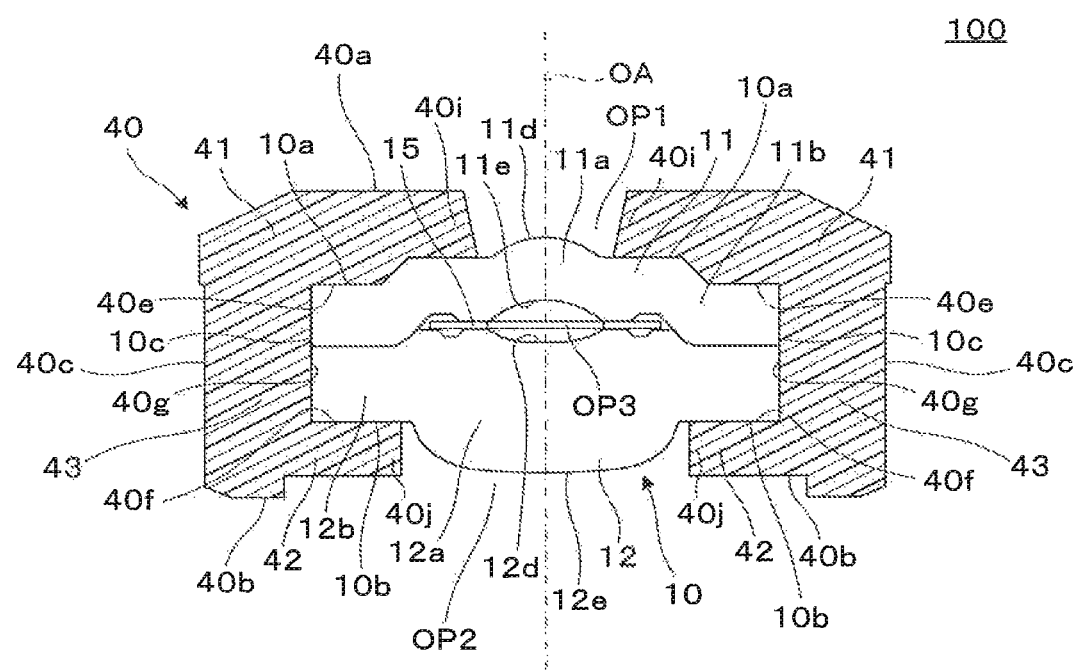
FIG. 1 is a side sectional view illustrating a structure of an image pickup lens unit according to a first embodiment.
Figure 2A:
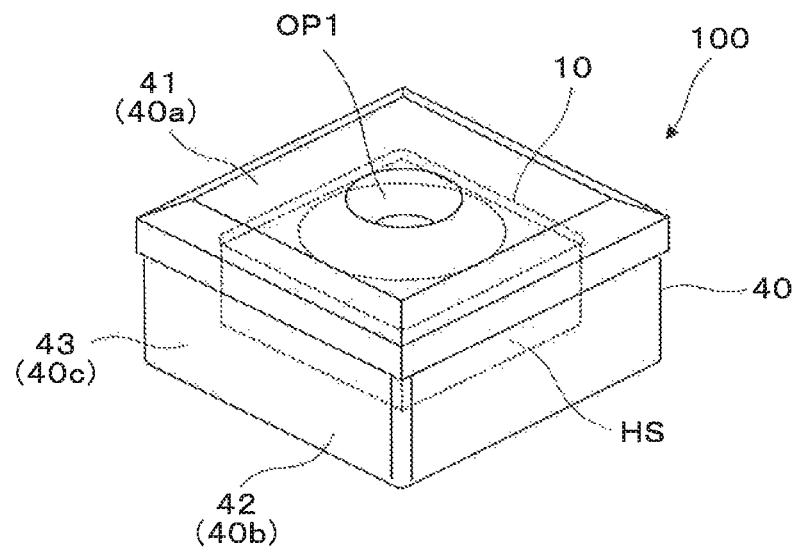
FIG. 2(A) is a perspective view of the image pickup lens unit.
Figure 2B:
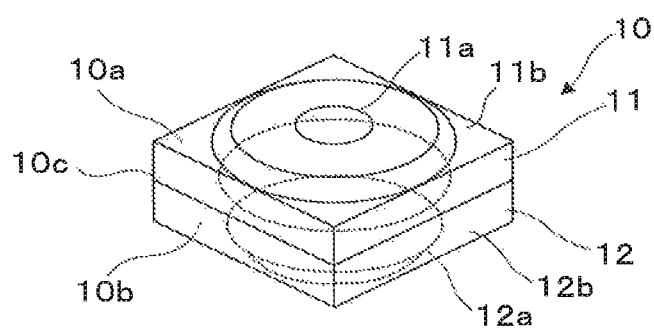
FIG. 2(B) is a perspective view of a lens.

As shown in FIG. 1 or in FIGS. 2(A) and 2(B), an image pickup lens unit 100 includes a lens 10 which is a stacking-type lens assembly or compound lens, and a holder member 40 which is a box-like member which houses the lens 10.

Herein, the lens 10 is, for example, cut out through dicing from a lens wafer (wafer-shaped base material) in which several lenses are arranged, has a contour that is quadrilateral shaped in the plan view, and also has a quadrilateral prism-like side surfaces. The lens 10 includes a first lens element 11 on the object side, a second lens element 12 on the image side, and a stop 15 interposed between the two.

In the lens 10, the first lens element 11 includes a lens main body 11a having a circular contour and provided in the center around the optical axis OA, and a frame portion 11b having a quadrilateral contour and extending in the vicinity or surrounding of the lens main body 11a. The lens main body 11a, for example, is an aspheric lens portion having a pair of optical surfaces 11d and 11e. Herein, the first optical surface 11d and a first frame surface 10a which will be described later, which are on the upper side, constitute a first surface of the lens 10. The first lens element 11, for example, is formed of a curable resin having reflow heat resistance however does not have to be entirely formed of a resin. The first lens element 11a may have a structure in which a glass plate is sandwiched by molded resin bodies. In addition, the entire first lens element 11 may also be formed of a glass. Curable resins include heat-curable or thermo-settable resins, light-curable resins, radiation-curable resins, or the like.

The second lens element 12 also includes a lens main body 12a having a circular contour and provided in the center around the optical axis OA, and a frame portion 12b having a quadrilateral contour extending the surrounding or vicinity of the lens main body 12a. The lens main body 12a, for example, is an aspheric lens portion having a pair of optical surfaces 12d and 12e. Herein, the second optical surface 12e on the lower side and a second frame surface 10b described later, which are on the lower side, constitute a second surface of the lens 10. The second lens element 12, for example, is formed of a curable resin, but can also have a structure in which a glass plate is sandwiched by molded resin bodies, or the entire lens element is formed from glass. In addition, the outer peripheral side of the frame portion 12b of the second lens element 12 and the outer peripheral side of the frame portion 11b of the first lens element 11, for example, are integrated by adhering and fixing with an adhesive, and the lens 10 including both lens elements 11 and 12 can be handled as a single lens. Furthermore, the lens 10 can also be formed by adhering the first lens element 11 and the second lens element 12 by inserting a spacer in between. The lens 10 can also have a configuration in that the resin-made first lens element 11 is formed on one surface of a glass substrate, and the resin-made second lens element 12 is formed on the other surface of the glass substrate.

The stop 15 is a ring-shaped member having an opening OP3 in the center. The stop 15 is inserted and fixed between the inner peripheral side of the frame portion 11b of the first lens element 11, and the inner peripheral side of the frame portion 12b of the second lens element 12. The stop 15, for example, is formed of a metallic plate or resin film having a light blocking effect, or an opaque black photoresist material for example black-colored one. The stop 15 is also to be formed of a material having reflow heat resistance.

The holder member 40 housing the lens 10 is formed of a thermoplastic resin having reflow heat resistance (for example, Liquid Crystal Polymer (LCP), Polyphthalamide (PPA) and so forth). The holder member 40 includes an upper part 41 having a quadrilateral plate-shaped contour, a bottom part 42 having a quadrilateral plate-shaped contour, and a side wall part 43 having a quadrilateral pipe contour. A quadrilateral prism-shaped housing space HS enable inserting and holding the lens 10 is formed in the inner portion of the holder member 40. The holder member 40 is integrally molded by injection molding of a resin, and is formed as an integrated single member. The details will be described later.

Since the lens 10 and the holder member 40 are formed of a material having reflow heat resistance, it is possible to process or treat the image pickup lens unit 100 having heat resistance in a reflow step.

The upper part 41 of the holder member 40 is facing the first frame surface 10a of the upper side of the lens 10 held in the housing space HS, and restricts or limits the movement of the lens 10 in the upper direction along the optical axis OA of the lens 10. The bottom part 42 is facing the second frame surface 10b of the lower side of the lens 10, and restricts the movement of the lens 10 in the lower direction along the optical axis OA of the lens 10. The side wall part 43 is facing the four side surfaces 10c of the lens 10, and restricts or limits the movement of the lens 10 to a lateral or horizontal direction perpendicular to the optical axis OA of the lens 10. As described above, since the holder member 40 as a single member comes into intimate contact with the lens 10 at the upper part 41, the bottom part 42, and the side wall parts 43, the movement of the lens 10 with respect to the holder member 40 is reliably prevented.

A circular opening OP1 is formed in the center of the upper 41. Since an annular edge portion 40i surrounding the opening OP1 is disposed so as to cover the periphery of the optical surface 11d of the lens 10, the edge portion 40i functions as a kind of a stop. In addition, a circular opening OP2 is formed in the center of the bottom part 42. Since an annular edge portion 40j surrounding the opening OP2 is disposed so as to cover the periphery of the optical surface 12e of the lens 10, the edge portion 40j functions as a kind of a stop. That is, the edge portion 40i surrounding the opening OP1 and the edge portion 40j surrounding the opening OP2 performs both functions as a member which limits the movement of the lens with respect to the direction perpendicular to the optical axis OA of the lens 10, and as a stop.

In addition, among the surfaces of the lens 10, surfaces except for the optical surfaces 11d which is finally exposed and 12e and a region vicinity of the optical surfaces 11d and 12e with which the mold comes into contact with at the molding, come into contact with a none-solidified fluid resin at the time of injection molding of the holder member 40. Accordingly, by solidifying the resin, an inner surface 40e of the upper 41 of the holder member 40 is in a state of being adhered to the first frame surface 10a of the lens 10, and an inner surface 40f of the bottom part 42 is in a state of being adhered to the second frame surface 10b of the lens 10, for example. Particularly, in a case where the surface of the lens 10 is made of a resin, the surfaces of the first frame surface 10a of the lens 10 and an inner surface 40e of the upper part 41 of the holder member 40 can be welded and strongly joined with each other, since the first frame surface 10a of the lens 10 are softened by heat generated when injection molding of the holder member 40, and then they are directly joined to each other without using an adhesive. In the same manner, in a case where the surface of the lens 10 is made of a resin, the second frame surface 10b of the lens 10 and an inner surface 40f of the bottom part 42 of the holder member 40, and the side surface 10c of the lens 10 and an inner surface 40g of the side wall part 43 of the holder member 40 are joined to each other by welding, and directly joined to each other, respectively, without using an adhesive. In a case where the lens 10 is made of a resin material which is difficult to be welded to the holder member 40, and in a case where the lens 10 is made of glass, the lens and the resin are not welded to each other in a process of the injection molding of the resin, however, since the fluid resin is solidified in a state where the fluid resin comes into intimate contact with the frame surfaces 10a and 10b of the lens 10, the holder member 40 is in a state of being adhered to the lens 10, and it is possible to stick the holder member 40 fast to the lens 10.

Since the holder member 40 comes into intimate contact with the periphery of the lens without any spaces, the image pickup lens unit 100 including such configuration can prevent generation of ghost or flare caused by incident light from the side surface of the lens. In addition, since there is no unnecessary space on the side surface of the lens, the image pickup lens unit 100 is miniaturized, and an appearance which is required when it is assumed to be mounted on a final product such as an imaging device is easily satisfied. Degradation of dimension accuracy caused by deformation during mold releasing is also suppressed.

Hereinafter, a method for manufacturing the image pickup lens unit 100 shown in FIG. 1 will be described with respect to a manufacturing procedure shown in FIG. 3 and others.

Figure 3:
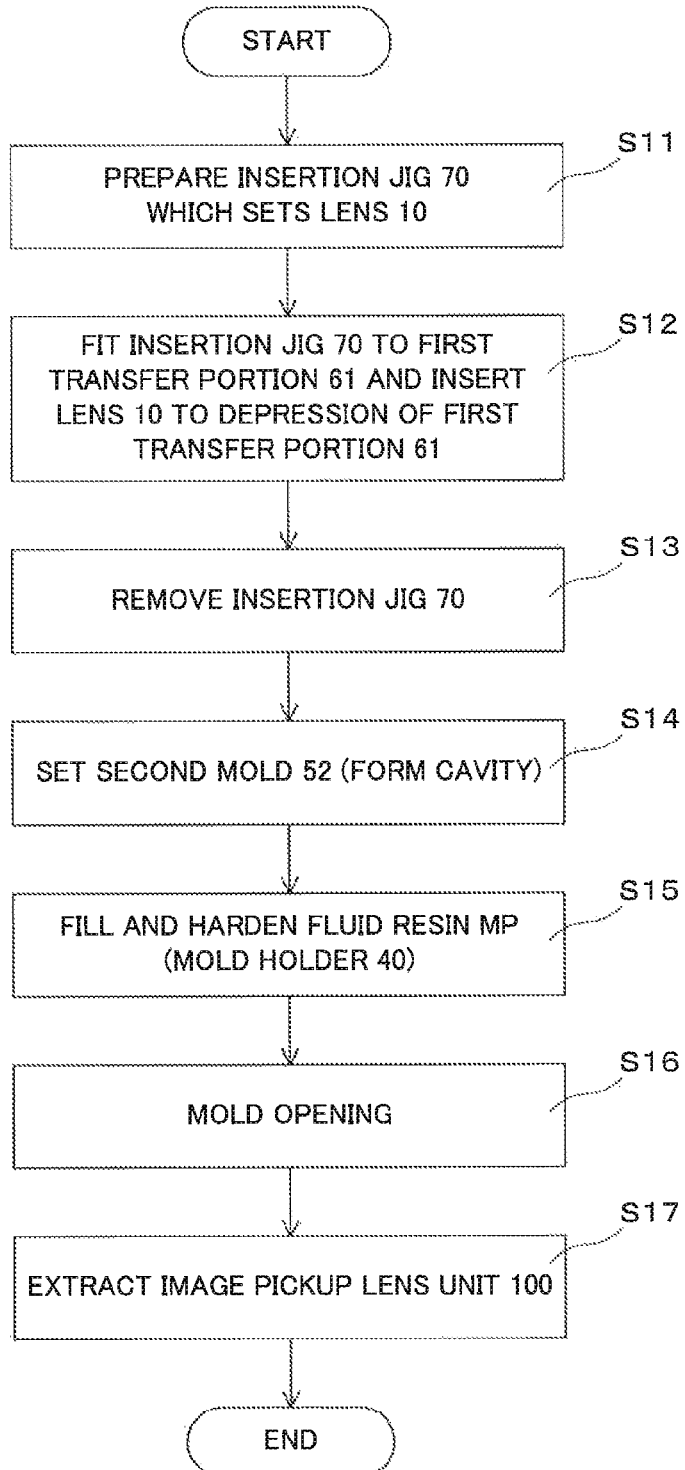
FIG. 3 is a flowchart for explaining a procedure of manufacturing the image pickup lens unit illustrated in FIG. 1.
Figure 4:
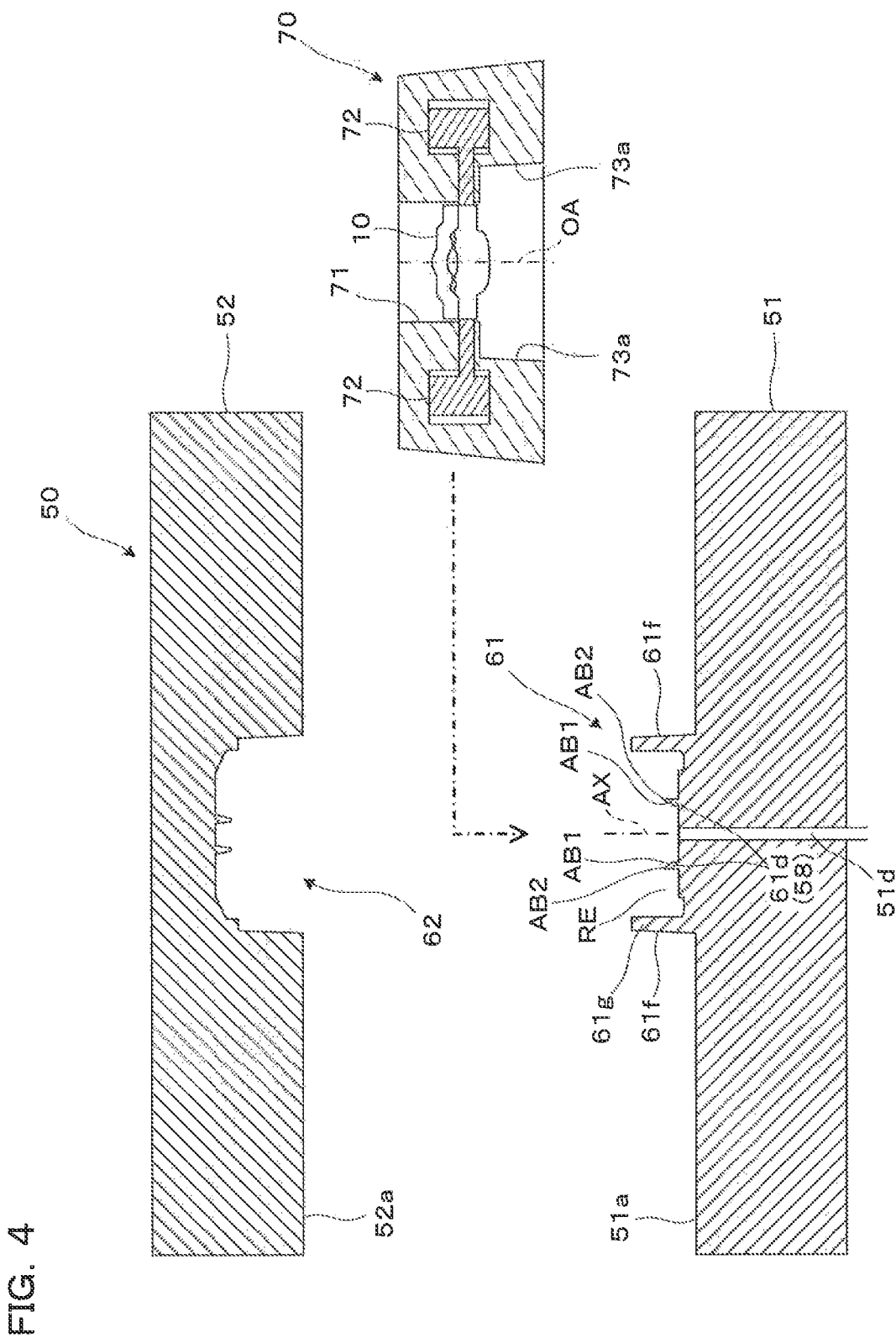
FIG. 4 is a cross-sectional view for explaining a function or the like of an insertion jig that holds a lens.

As shown in FIG. 4, by suitably operating a mold apparatus 50 includes a first mold 51 on the fixed side and a second mold 52 on the movable side. First, by appropriately operating the mold apparatus 50, the second mold 52 is set to a withdrawal state, both molds 51 and 52 are brought in an opened state, and an insertion jig 70 holding the lens 10 is moved to a position above a first molding portion 61 provided on the first mold 51 (step S11 of FIG. 3). The first molding portion 61 which is a movement destination of the insertion jig 70 is provided to project from a parting surface 51a of the first mold 51. In addition, facing the first molding portion 61, on the second mold 52 side, a second molding portion 62 is provided to scoop in from a parting surface 52a o. A resin filling port (not shown) is provided in at least one of both molds 51 and 52. In addition, a heating mechanism for heating the molds 51 and 52, a platen for pressing the molds 51 and 52 from the back, or the like are also provided; however, they have been omitted from the figure to simplify the understanding.

The insertion jig 70 is a annular member, and configured to temporally hold the lens 10 in a central through hole 71. The insertion jig 70 is remotely driven by a control driving device (not shown) and transports the lens 10. In addition, the insertion jig 70 includes a chuck member 72 of fluid drive type having a plurality of pressing members or locking members which is configured to advance and retract towards the side surface 10c of the lens 10. The insertion jig 70 presses the side surface 10c of the lens 10 by the chuck member 72 from a plurality of directions. Accordingly, it is possible to support the lens 10 in the center of the through hole 71 as in a setup state shown in the drawing, and in the release state described later, the lens 10 inside the through hole 71 can be moved in the direction of the optical axis OA of the lens 10. In addition, instead of the chuck member 72 described above, it is also possible to employ a mechanism which holds the lens 10 such that the lens 10 does not fall due to the air flow for the insertion jig 70. Further, in the lower part of the insertion jig 70, a annular fitting surface 73a having a taper for fitting with the first mold 51 is provided.

Figure 5:
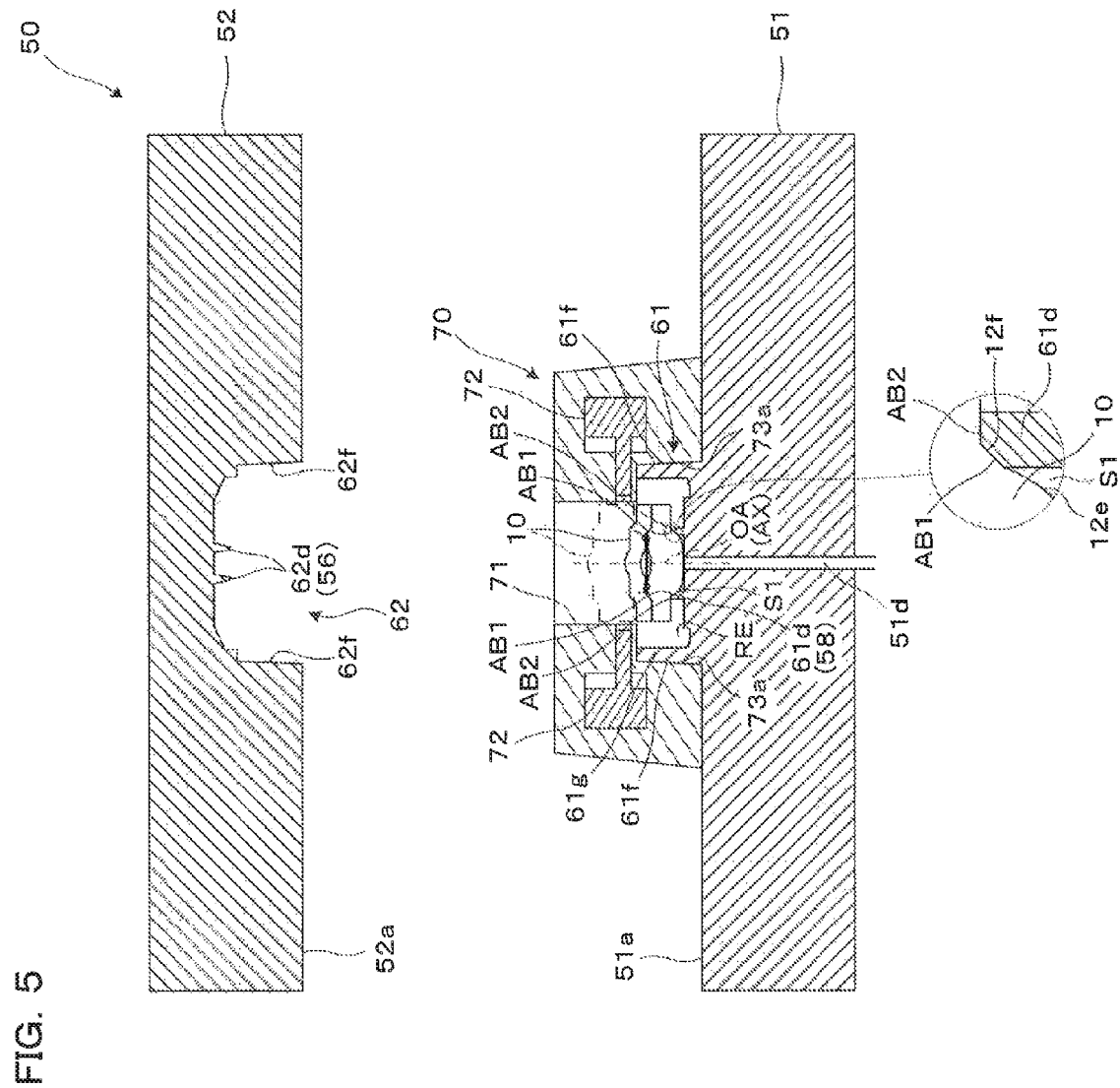
FIG. 5 is a cross-sectional view for explaining the setting of the lens in a fixed mold by the insertion jig.

Next, as shown in FIG. 5, the insertion jig 70 is brought down to the first mold 51 and the fitting surface 73a on the inner side of the lower portion of the insertion jig 70 is fitted with a fitting surface 61f of a fitting member 61g which stands by attaching a taper on the first molding portion 61. Thus, the optical axis OA of the lens 10 held by the insertion jig 70 and an axis AX of the first molding portion 61 of the first mold 51 can be almost aligned. In this state, if the insertion jig 70 is switched to a released state, the lens 10 whose gripping is released by the chuck member 72 falls and is inserted into a depression RE of the first molding portion 61, and is held in a state of being aligned in the depression RE (installing step; step S12 of FIG. 3).

In that case, the lens 10 is mounted on a holding member 58 which is formed on the bottom part of the first molding portion 61. The holding member 58 is formed of a cylindrical protrusion 61*d*. The protrusion 61*d* supports the lens 10 from the lower side and is positioned in a horizontal direction. That is, the holding member 58 is a positioning member which precisely positions the lens 10 with respect to a direction perpendicular to the optical axis OA. Herein, an inclined surface 12*f* as bending part is provided between the outer peripheral surface of the lens main
body 12*a* and the frame portion 12*b* so as to surround the optical surface 12*e*, and a contact flat surface AB2 corresponding to the frame portion 12*b* and a contact inclined surface AB1 corresponding to the inclined surface 12*f* are provided on the upper end side of the protrusion 61*d* of the holding member 58. When receiving the lens 10, the contact inclined surface AB1 of the protrusion 61*d* has a role to make the optical axis AX of the first molding portion 61 precisely aligned or coincide with the optical axis OA of the lens 10 by coming in contact with the inclined surface 12*f* of the second lens element 12 (see enlarged view). In addition, in molding which will be described later, the protrusion 61*d* of the holding member 58 has a role to block the flow of a fluid resin MP to a space S1 which is adjacent to the optical surface 12*e* of the lens 10 (see FIG. 7)

In addition, the positioning of the lens 10 corresponding to the first mold 51 may be realized by forming a contact surface facing an inclined portion (bending part) which is in a surface of the lens main body 12*a* constituting the optical surface 12*e* of the second lens element 12 and is in the region outside the effective, on the holding member 58, and by bringing the contact surface into contact with the inclined portion of the lens 10. In that case, it is not particularly necessary to provide the bending part such as the inclined surface to perform positioning on a surface formed of the optical surface 12*e* of the second lens element 12. In any cases, it is possible to perform positioning using the bending part formed on the optical surface 12*e* of the lens 10, and to make the positioning by the side surface or the inclined surface 12*f* of the lens 10 unnecessary. Accordingly, it is possible to form the holder member 40 in a state of not affecting to a shape of the holder without interrupting the molding of the holder member 40 on the side surface of the lens 10. In addition, since the holder member 40 is disposed to be close to the optical surface 12*e* of the lens 10, it is possible to improve a light shielding property of the holder member 40 and to make the holder member function as a stop.

A pressure reducing tube 51*d* which communicates with the center of the bottom surface of the first molding part 61 is formed on the first mold 51. The pressure reducing tube 51*d* can exhaust air to the external portion at an appropriate timing with a driving mechanism associated with the mold apparatus 50, and by reducing pressure in the space S1 adjacent to the optical surface 12*e*, it is possible to suck the lens 10 mounted on the protrusion 61*d* of the holding member 58 to fix the lens 10 on the protrusion 61*d* with desired adsorption force. In addition, when it is desired to release the fixing of the lens 10 with respect to the protrusion 61*d* of the holding member 58, it is only necessary to stop reducing the pressure of the space S1.

Figure 6:
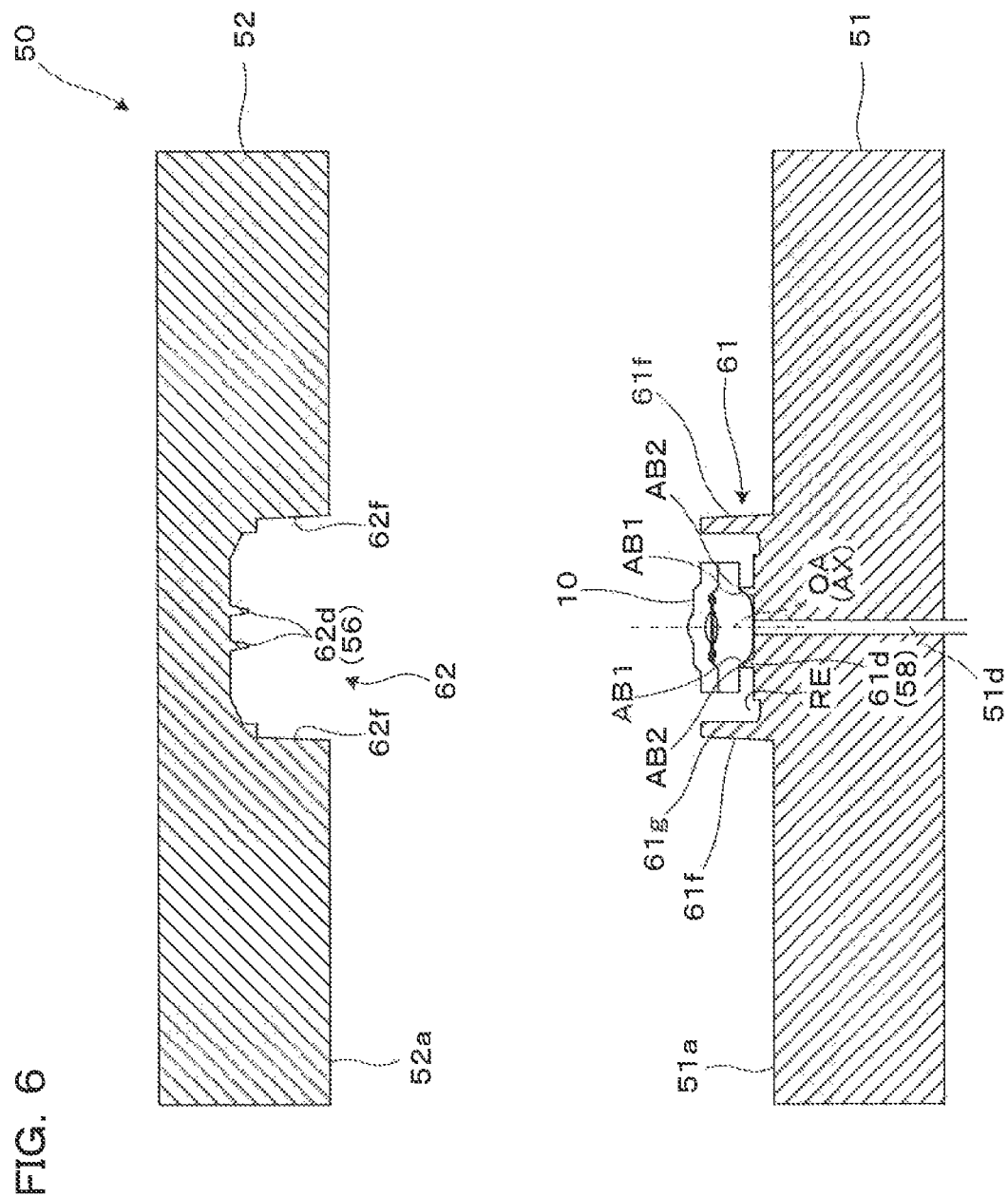
FIG. 6 is a cross-sectional view for explaining after removing an insertion jig.

After that, as shown in FIG. 6, the insertion jig 70 is removed from the first mold 51 (step S13 of FIG. 3).

Next, as shown in FIG. 7(A), by moving the second mold 52 to perform mold clamping, a cavity CA which is a mold space for the holder member 40 is formed between the first mold 51 and the second mold 52 (step S14 of FIG. 3). At that time, the first molding portion 61 provided on the first mold 51 and the second molding portion 62 provided on the second mold 52 are fitted to each other. Herein, transfer surfaces 61*b* and 61*c* each of which for molding a rear surface 40*b* and an outer peripheral side surface 40*c* of the holder member 40 shown in FIG. 1 are formed on the first molding portion 61. In addition, a transfer surface 62*a* for molding an upper surface 40*a* or the like of the holder member 40 is formed on the second molding portion 62 on the second mold 52 side. Further, a fixing member 56 which includes a columnar protrusion 62*d* is formed on the second molding portion 62. The protrusion 62*d* prevents flow of the fluid resin MP to the space S2 which is adjacent to the optical surface 11*d* of the lens 10. In addition, when forming the cavity CA as a molding space by the molding clamping, by contacting the innermost peripheral portion of the frame portion 11*b* of the lens 10 and softly pressing the lens 10 downward, the protrusion 62*d* stabilizes the lens 10 in the cavity CA and prevents from the generation of play. That is, the fixing member 56 is a pressing member.

In addition, since a fitting surface 62*f* provided with a slight taper is formed on the inner periphery of the second molding portion 62 (see FIG. 5), by only fitting the second molding portion 62 to the first molding portion 61, the fitting surface 61*f* of the fitting member 61*g* of the first mold 51 and the fitting surface 62*f* of the second mold 52 are engaged with each other. Accordingly, precise alignment in the lateral direction is achieved between both molding portions 61 and 62. In addition, when both molding portions 61 and 62 are fitted to each other, an upper surface 61*p* of the fitting member 61*g* of the first molding portion 61 and an outer peripheral bottom surface 62*p* of the second molding portion 62 are arranged to be close to each other or to be in intimate contact with each other. The surfaces 61*p* and 62*p* functions as a parting line with regards to the molding of the holder member 40. As described above, it is possible to precisely align the second molding portion 62 with respect to the first molding portion 61, and to the lens 10.

Next, as shown in FIG. 7(B), by filling the cavity CA which is the molding space with the fluid resin MP which is to be a material of the holder member 40, each of a lower surface of the frame portion 12*b* of the second lens element 12, the side surface 10*c* of the lens 10, and an upper surface of the frame portion 11*b* of the first lens element 11 is covered with the resin. Then, by performing solidification with temperature control, the holder member 40 is molded (molding step; step S15 of FIG. 3). Accordingly, the image pickup lens unit 100 in which the lens 10 is housed and fixed in the holder member 40 in a state where the lens 10 is supported between the openings OP1 and OP2 of the holder member 40 as shown in FIG. 1 is manufactured. At that time, the holding member 58 and the fixing member 56 provided on the first and second molding portions 61 and 62 has a role to form the openings OP1 and OP2 on the holder member 40 by preventing the fluid resin MP from flowing to the spaces SP1 and SP2.

In addition, at a stage where the cavity CA is filled with the fluid resin MP in a molding step, the air exhausting from the pressure reducing tube 51*d* is stopped and reducing of the pressure of the space S1 is ended. If nothing intervenes, the air exhausting may be stopped immediately after the mold clamping of the mold, or the air exhausting may be continued until the resin is solidified.

Then, as shown in FIG. 8(A), by removing the second mold 52 by the mold opening which separates the second mold 52 from the first mold 51 (step S16 of FIG. 3), and, as shown in FIG. 8(B), by projecting and mold releasing the image pickup lens unit 100 using an ejector pin (not shown) or the like provided on the first mold 51, it is possible to extract the image pickup lens unit 100 as a completed product from the first mold 51 (step S17 of FIG. 3).

According to the image pickup lens unit 100 of the first embodiment, in the installing step, the lens 10 is positioned by the holding member 58 provided in a position corresponding to the opening OP2 by the mold 51. Accordingly, it is possible to cover the entire side surface of the lens 10 with the resin without interrupting the molding of the holder member 40 at a portion corresponding to the side surface of the lens 10, and it is possible to reliably fix the lens 10 in the molds 51 and 52. Thus, it is possible to avoid the deterioration of the dimension accuracy due to a remaining large positioning shape on the holder member 40. In addition, since the holder member 40 is integrally molded in a state of fixing the lens 10, it is possible to reliably perform molding and fixing of the holder member 40 collectively, and to avoid an increase of the number of components used for the assembling the holder member 40, and it is not necessary to configure the holder member by joining the plurality of components to each other. Since it is possible to perform the positioning of the lens 10 with the holding member 58, it is not necessary to install an image recognition device or to provide a positioning mechanism on a mold device, and it is possible to easily provide a high-accuracy manufacturing apparatus of the image pickup lens unit 100.

In addition, in the above description, for the alignment of the first molding portion 61 and the second molding portion 62, the fitting surfaces 61f and 62f provided thereon are used, however, it is possible to perform the same alignment with the taper pin or the like provided on the molds 51 and 52, other than the molding portions 61 and 62.

In addition, in the above description, the integral type group lens to which the lens 10 is joined has been described. In that case, the inserting and positioning steps of the lens 10 to the mold is simple, however, it is also possible to separately provide the first lens element 11, the second lens element 12, and the stop 15. In a case of separately providing the plurality of lens elements and the stop as described above, it is preferable to previously provide protrusion on the first lens element 11, the second lens element 12, and the stop 15, in order to realize positioning with each other. Then, after installing and positioning the second lens element 12 on the mold 51 by performing the steps S11 to S13 of FIG. 3, the stop 15 and the first lens element 11 are stacked, and positioned by the protrusion described above. After that, the steps subsequent to the step S14 of FIG. 3 may be executed.

Second Embodiment

In the following, a method for manufacturing an image pickup lens unit according to a second embodiment will be described. The method for manufacturing the image pickup lens unit according to the second embodiment is achieved by changing some parts of the method for manufacturing the image pickup lens unit 100 according to the first embodiment, and parts that are particularly not described are those that are the same as the first embodiment.

Figure 9A:
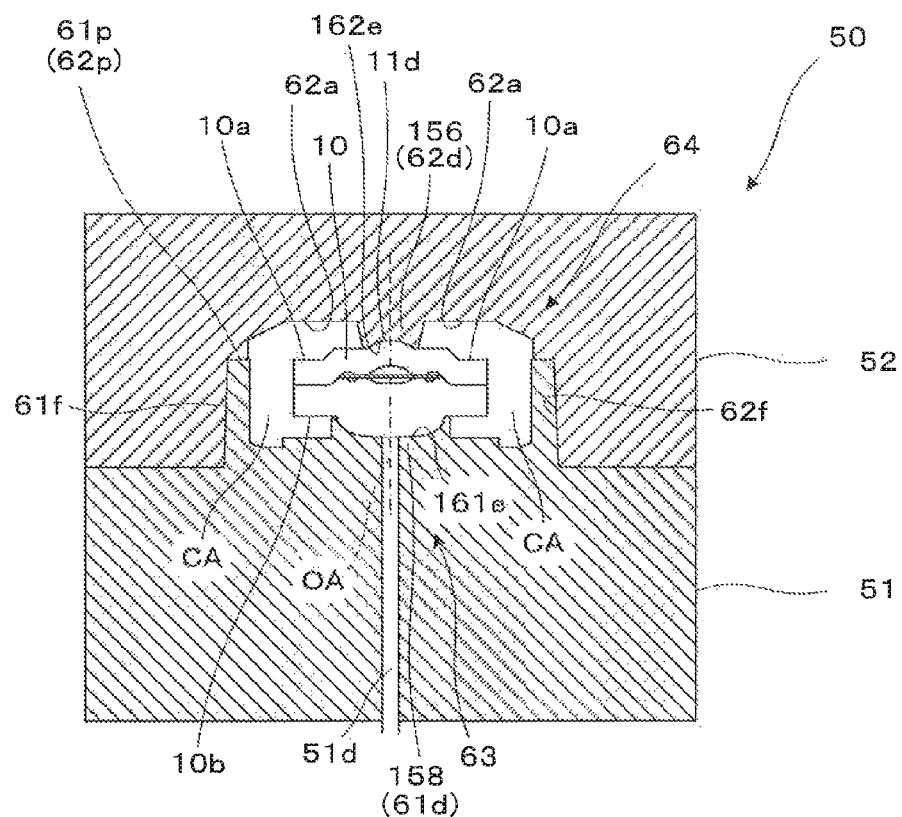
FIGS. 9(A) and 9(B) are cross-sectional views for explaining the image pickup lens unit and the method for manufacturing thereof according to a second embodiment.

As shown in FIG. 9(A), in the first mold 51, a holding member 158 provided on the inner portion of a third molding portion 63 is a columnar protrusion, and is configured so that an end surface 161e which is the contact surface has the same or almost the same curvature as the optical surface 12e (see FIG. 1) of the lens 10 and comes into contact as a surface with the optical surface 12e of the lens 10. Accordingly, since the end surface 161e of the holding member 158 comes into intimate contact as a surface with the optical surface 12e of the lens 10, the fluid resin MP can be prevented from leaking to the optical surface 12e. As a result, the opening OP2 can be formed in the holder member 40. In addition, by sucking the lens 10 positioned or loaded on the holding member 158, the end surface 161e of the holding member 158 and the optical surface 12e of the lens 10 are brought into more intimate contact with each other. Further, in a case where it is difficult to bring the holding member 158 in intimate contact entirely with the optical surface 12e, the holding member is brought in contact as a surface at least with a region other than the effective region of the optical surface 12e.

In the second mold 52, a fixing member 156 provided on the inner portion of a fourth molding portion 64 is a columnar protrusion, and is configured so that an end surface 162e which is the contact surface has the same or almost the same curvature as the optical surface 11d of the lens 10 and comes into contact as a surface with the optical surface 11d of the lens 10. Accordingly, when forming the cavity CA by the mold clamping, an end surface 162e of the fixing member 156 and the optical surface 11d of the lens 10 are brought into intimate contact with each other and the fluid resin MP can be prevented from leaking to the optical surface 11d. As a result, it is possible to form the opening OP1 on the holder member 40.

Figure 9B:
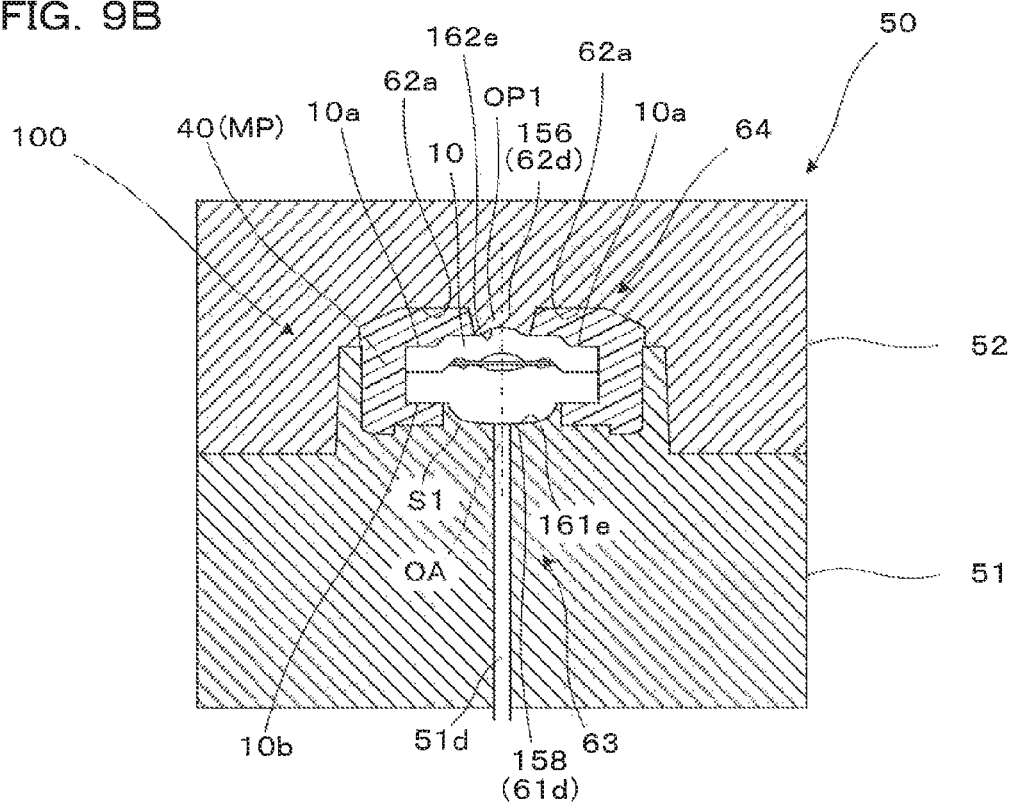

As shown in FIG. 9(B), the holder member 40 is molded by being filled with the fluid resin MP and being solidified with the temperature control (molding step; step S15 of FIG. 3). Accordingly, the image pickup lens unit 100 in which the lens 10 is housed and fixed in the holder member 40 in a state where the lens 10 is supported between the openings OP1 and OP2 of the holder member 40 is manufactured.

Third Embodiment

In the following, a method for manufacturing an image pickup lens unit according to the third embodiment will be described. The method for manufacturing the image pickup lens unit according to the third embodiment is achieved by changing some parts of the method for manufacturing the image pickup lens unit 100 according to the first embodiment, and parts that are particularly not described are those that are the same as the first embodiment.

Figure 10A:
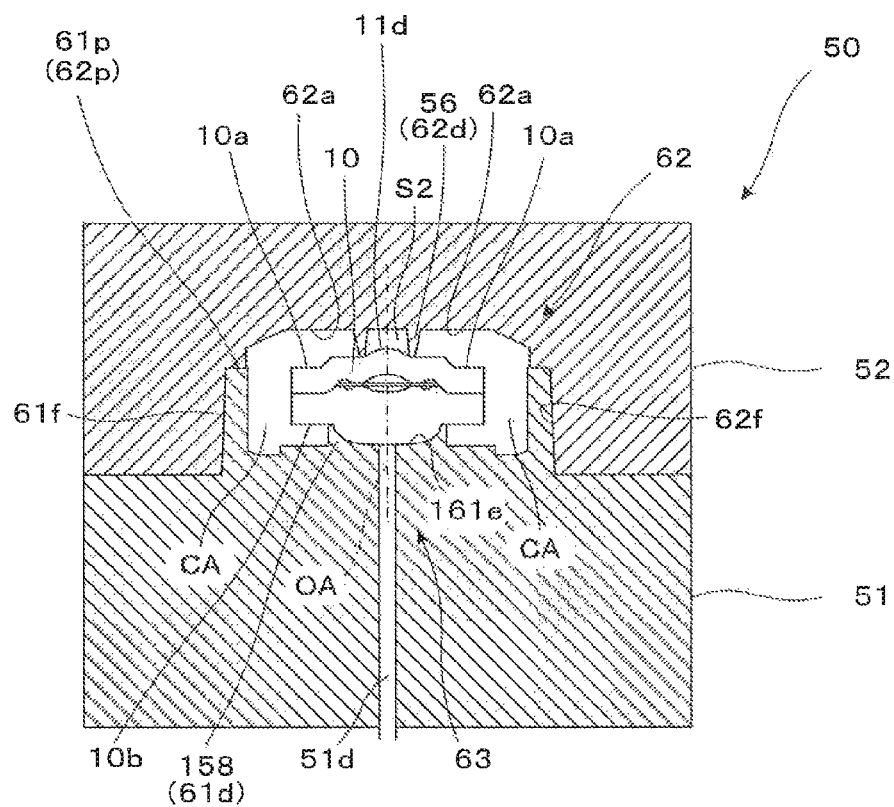
FIGS. 10(A) and 10(B) are cross-sectional views for explaining the image pickup lens unit and the method for manufacturing thereof according to a third embodiment.

As shown in FIG. 10(A), in the first mold 51, the holding member 158 provided on the inner portion of the third molding portion 63 is a columnar protrusion, and is configured so that the end surface 161e which is the contact surface has the same or almost the same curvature as the optical surface 12e (see FIG. 1) of the lens 10 and comes in to contact as a surface with the optical surface 11d of the lens 10. Accordingly, since the end surface 161e of the holding member 158 comes into intimate contact with the optical surface 12e of the lens 10, the fluid resin MP can be prevented from leaking to the optical surface 12e. As a result, the opening OP2 can be formed in the holder member 40. In addition, by sucking the lens 10 positioned or loaded on the holding member 158, the end surface 161e of the holding member 158 and the optical surface 12e of the lens 10 are brought into more intimate contact with each other.

In the second mold 52, the fixing member 56 provided on the inner portion of the second molding portion 62 is a columnar protrusion and prevents leakage of the fluid resin MP to the space 52 adjacent to the optical surface 11d of the lens 10. Thus, it is possible to form the opening OP1 on the holder member 40.

Figure 10B:
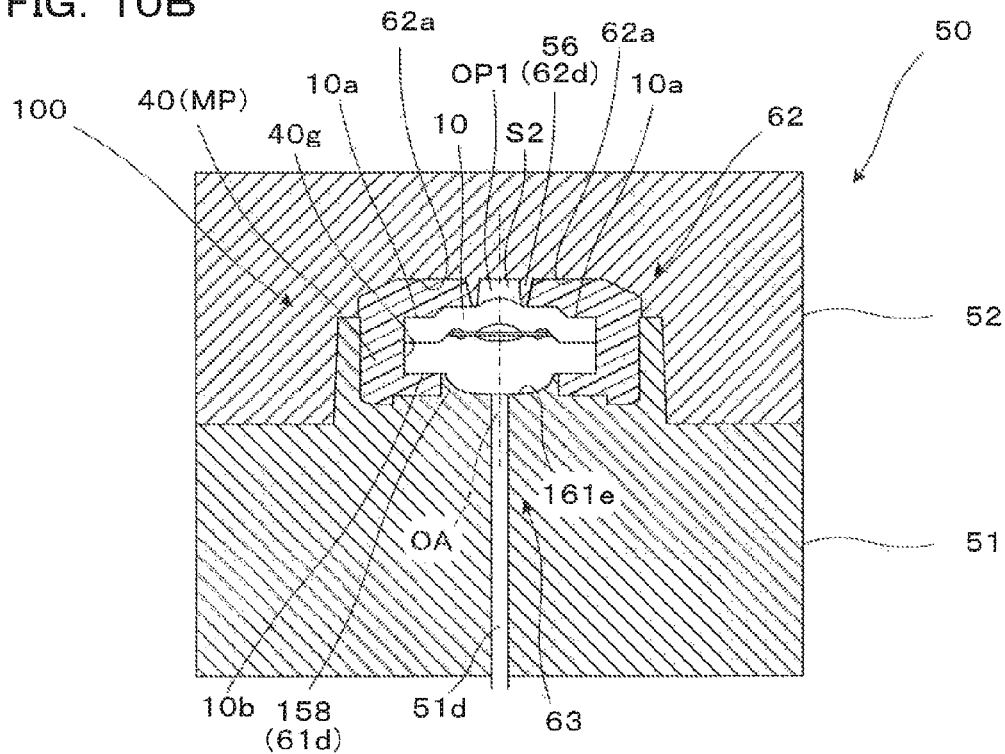

As shown in FIG. 10(B), the holder member 40 is molded by being filled with the fluid resin MP and being solidified with temperature control (molding step; step S15 of FIG. 3) Accordingly, the image pickup lens unit 100 in which the lens 10 is housed and fixed in the holder member 40 in a state where the lens 10 is supported between the openings OP1 and OP2 of the holder member 40 is manufactured.

Fourth Embodiment

In the following, a method for manufacturing an image pickup lens unit according to a fourth embodiment will be described. The method for manufacturing the image pickup lens unit according to the fourth embodiment is achieved by changing some parts of the method for manufacturing the image pickup lens unit 100 according to the first embodiment, and parts that are particularly not described are those that are the same as the first embodiment.

Figure 11A:
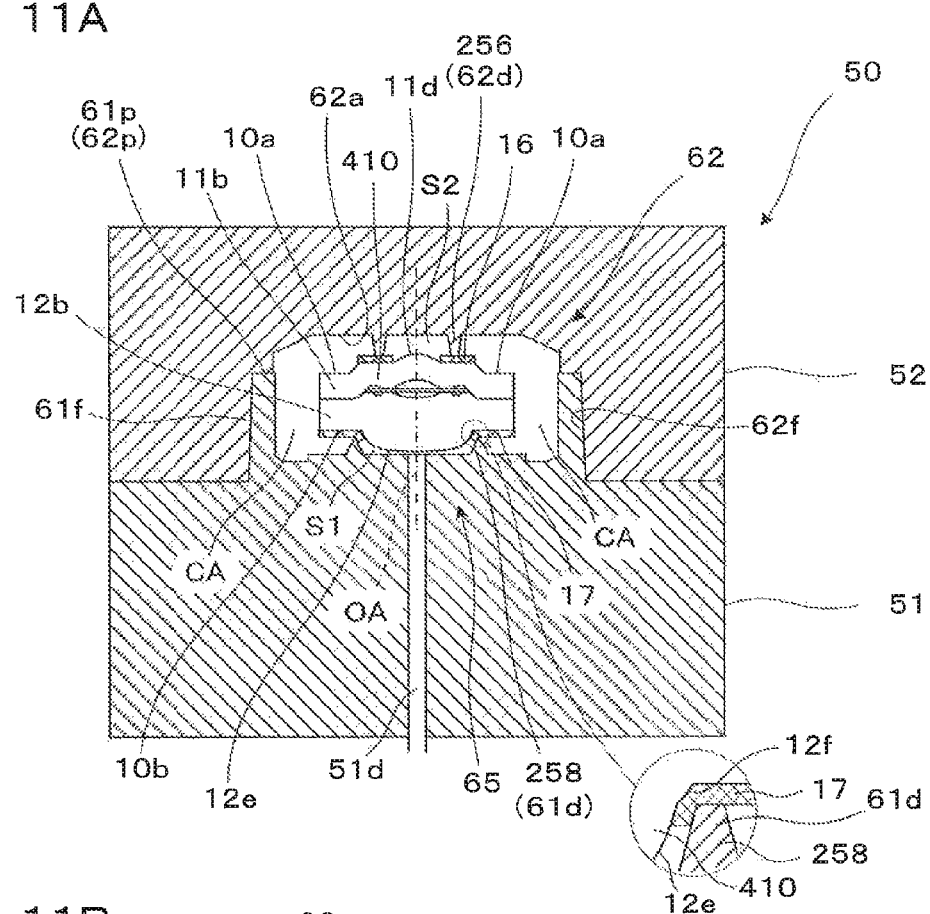
FIGS. 11(A) and 11(B) are cross-sectional views for explaining the image pickup lens unit and the method for manufacturing thereof according to a fourth embodiment.

As shown in FIG. 11(A), ring-shaped stop members 16 and 17 are provided on an upper side and a lower side of a lens 410, respectively. In detail, the stop member 16 is in the vicinity of the outer edge of the optical surface 11d and is provided on a part of the first frame surface 10a. The stop member 17 is provided on the entire second frame surface 10b. The stop members 16 and 17 are formed of a resin, for example, and are bracelet-shaped members including openings so as to expose the optical surfaces 11d and 12e. The stop members 16 and 17 are aligned and adhered to the lens 410 in advance, in a state according to the shape the shape of the first and second frame surfaces 10a and 10b of the lens 410. The stop members 16 and 17 have light elasticity, and it is possible to prevent damage on the lens 410 accompanied by bringing the lens 410, the holding member 258, and the fixing member 256 to contact with each other at the time of mold clamping.

In the embodiment, a fifth molding portion 65 of the first mold 51 and the second molding portion 62 of the second mold 52 have the same configuration as the first molding portion 61 and the second molding portion 62 of the first embodiment, however, the holding member 258 and the fixing member 256 are in a position to come into contact with the stop members 16 and 17 at the time of mold clamping. From them, by coming in contact with the inclined surface of the inner periphery of the stop member 17, the holding member 258 of the fifth molding portion 65 positions the lens 410 (see the enlarged view).

Figure 11B:
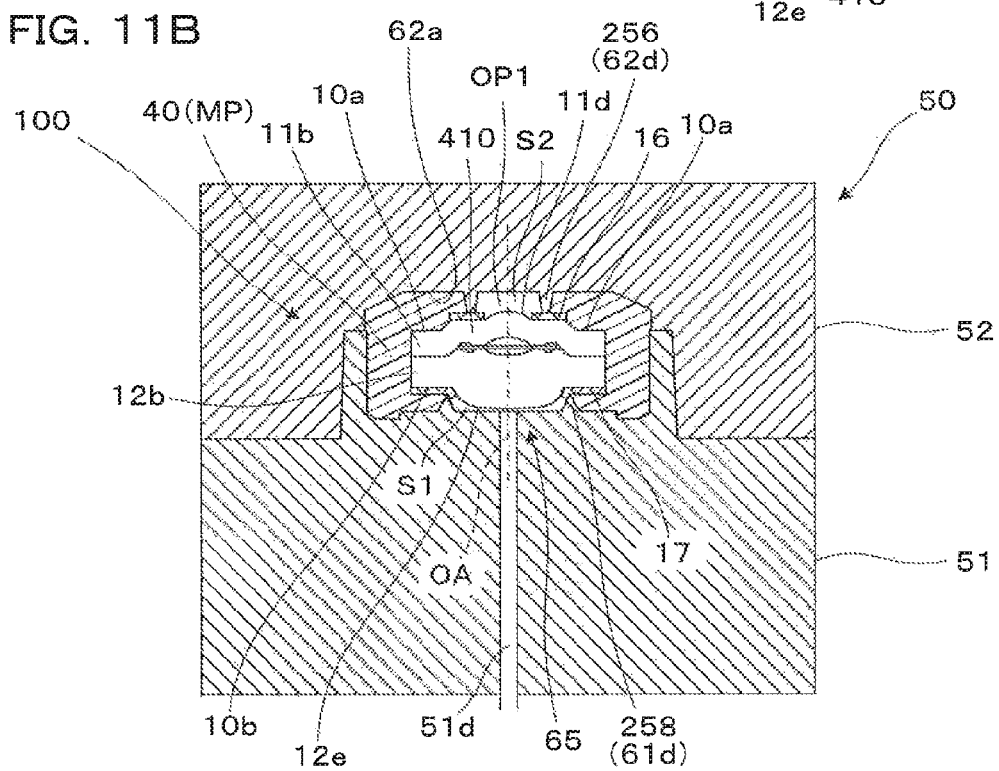

As shown in FIG. 11(B), the holder member 40 is molded by being filled with the fluid resin MP and being solidified with the temperature control (molding step; step S15 of FIG. 3). Accordingly, the image pickup lens unit 100 in which the lens 410 is housed and fixed in the holder member 40 in a state where the lens 410 is supported between the openings OP1 and OP2 of the holder member 40 is manufactured. The image pickup lens unit 100 is configured to include the stop members 16 and 17 between the lens 410 and the holder member 40 and on the inner side of the openings OP1 and OP2 of the holder member 40.

In the embodiment, it is possible to improve a light shielding property by providing the stop members 16 and 17 on the inner side of the openings of the holder members 40. In addition, in a case where the stop members 16 and 17 are formed of a material having elasticity such as a resin, it is possible to prevent damage on the lens 410 accompanied by bringing the lens 410 contact with the holding member 258 which is the positioning member at the time of mold clamping.

Fifth Embodiment

In the following, a method for manufacturing an image pickup lens unit according to a fifth embodiment will be described. The method for manufacturing the image pickup lens unit according to the fifth embodiment is achieved by changing some parts of the method for manufacturing the image pickup lens unit 100 according to the first embodiment, and parts that are particularly not described are those that are the same as the first, embodiment.

Figure 12A:
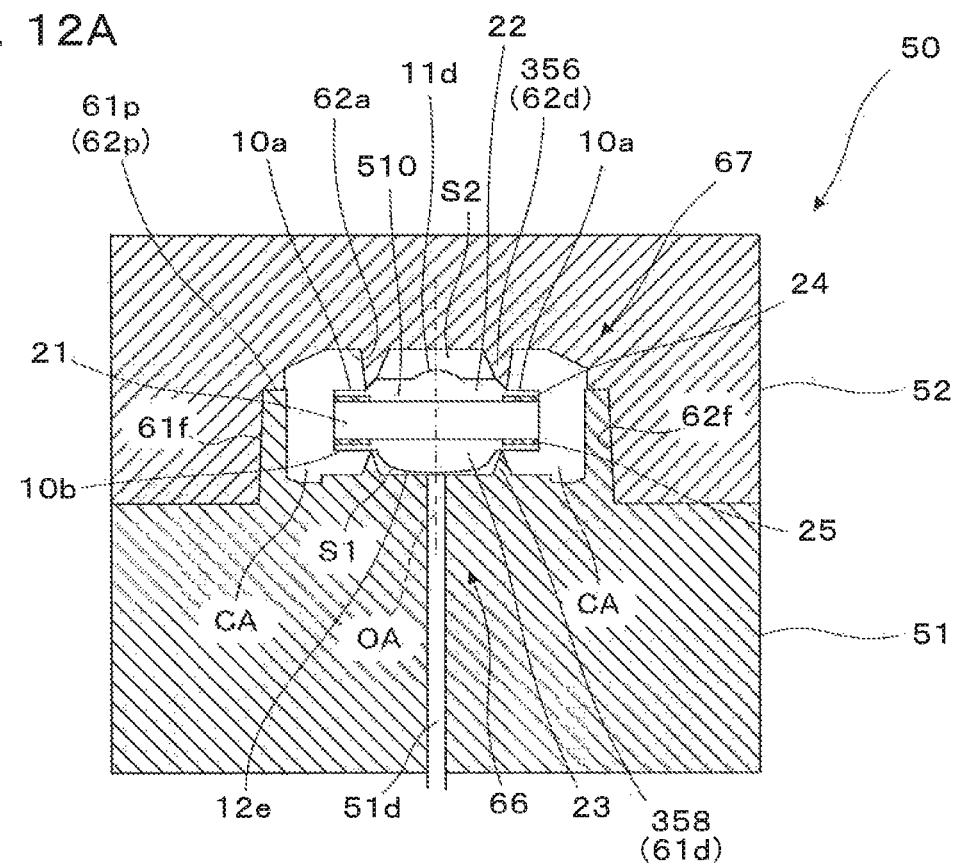
FIGS. 12(A) and 12(B) are cross-sectional views for explaining the image pickup lens unit and the method for manufacturing thereof according to a fifth embodiment.

As shown in FIG. 12(A), a lens 510 is a composite lens or compound lens in which a glass substrate 21 is interposed between a first lens layer 22 and a second lens layer 23 which are formed of a resin. A first stop 24 is provided between the glass substrate 21 and the first lens layer 22, and a second stop 25 is provided between the glass substrate 21 and the second lens layer 23. The stops 24 and 25 are bracelet-shaped members including openings having shapes according to edges of the openings OP1 and OP2 of the holder member 40, without interference to the optical surface 12e of the second lens layer 23 side. The stops 24 and 25 are formed of metal films or resin films having a light shielding property, for example. As the resin films having a light shielding property, black paint or black photoresist can be used. The lens 510 is acquired by molding the first and second lens layers 22 and 23 after forming or attaching metal films or resin films as the stops 24 and 25 on both surfaces of the glass substrate 21, for example.

In the embodiment, a sixth molding portion 66 of the first mold 51 and a seventh molding portion 67 of the second mold 52 correspond to the first molding portion 61 and the second molding portion 62 of the first embodiment, respectively, however, positions of a holding member and a fixing member are different. A holding member 358 of the sixth molding portion 66 supports the frame portion 12b of the second lens layer 23, and a fixing member 356 of the seventh molding portion 67 comes into contact with the inclined surface provided on the frame portion 11b of the first lens layer 22, and accordingly, the lens 510 is positioned. The positioning of the lens 510 is performed, after loading the lens 510 on the holding member 358 of the first mold 51, by fitting the seventh molding portion 67 of the second mold 52 to the sixth molding portion 66 of the first mold 51, and bring the fixing member 356 of the second mold 52 into contact with the inclined surface formed on the surface of the first lens layer 22 to press downward.

Figure 12B:
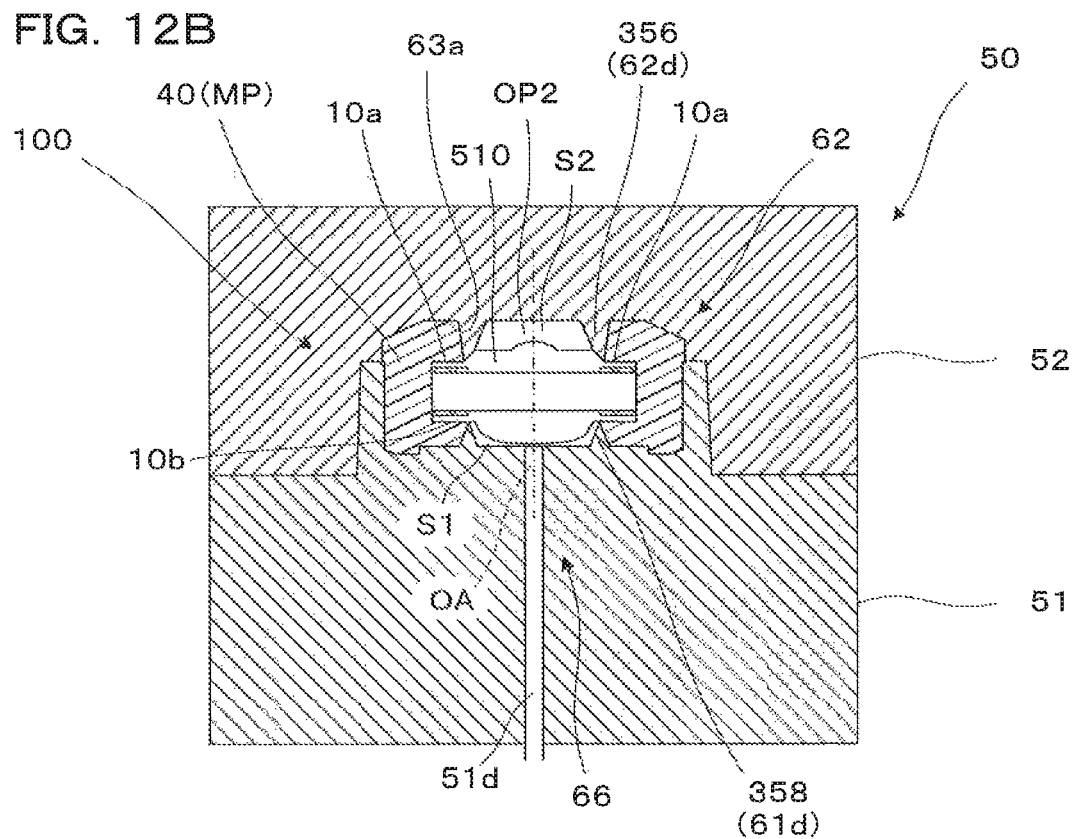

As shown in FIG. 12(B), the holder member 40 is molded by being filled with the fluid resin MP and being solidified with the temperature control (molding step; step S15 of FIG. 3). Accordingly, the image pickup lens unit 100 in which the lens 510 is housed and fixed in the holder member 40 in a state where the lens 510 is supported between the openings OP1 and OP2 of the holder member 40 is manufactured.

Figure 13A:
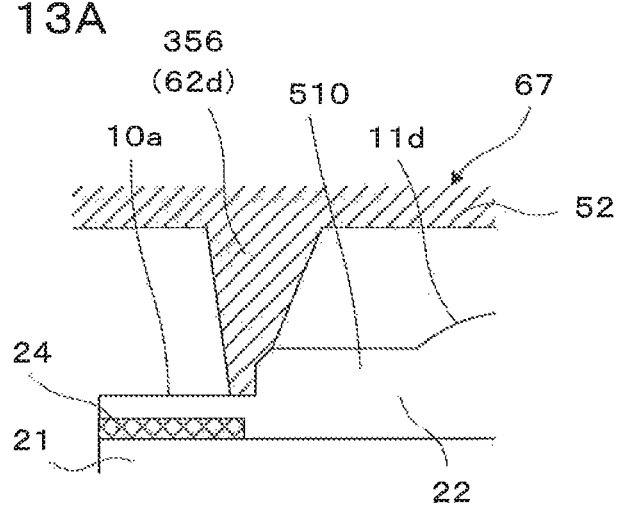
FIGS. 13(A) to 13(C) are partial cross-sectional views for explaining a modification example of the image pickup lens unit and the method for manufacturing thereof according to a fifth embodiment.
Figure 13B:
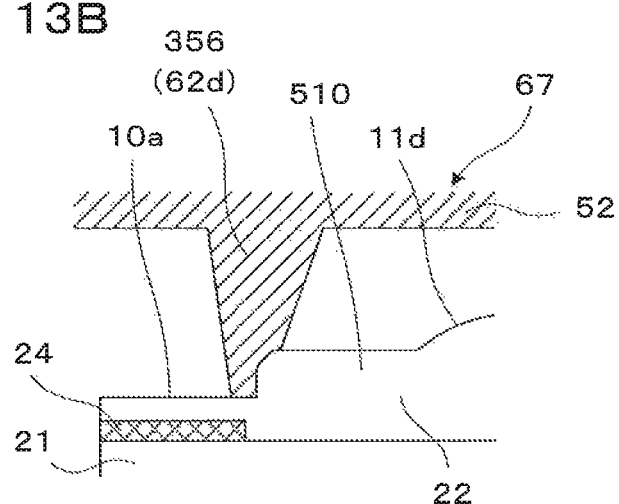
Figure 13C:
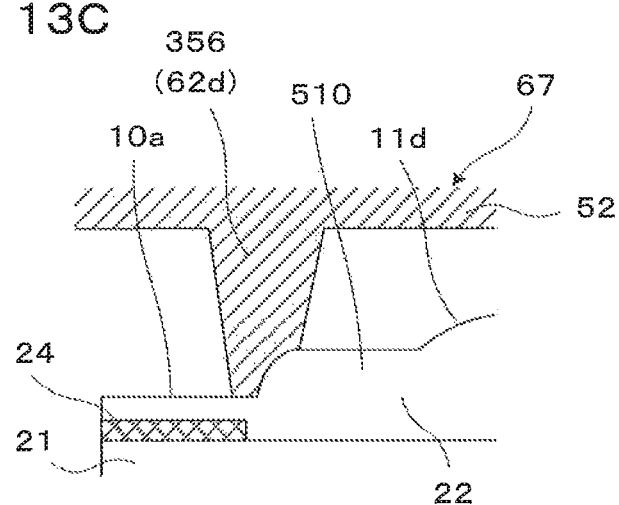

As shown in the embodiment, it is possible to perform the positioning of the lens 510 with the fixing member 356 provided on the mold 52 on the upper side. In addition, in the embodiment, the positioning is performed using the inclined surface formed in the position separated from the optical surface on the surface of the first lens layer 22, however, it is not limited thereto, and various embodiments can be employed. For example, it is also possible to perform positioning using an inclined surface and a vertical surface (see FIGS. 13(A) and 13(B)) or a round surface (FIG. 13(C)) having an arc cross section, which are provided in the position separated from the optical surface on the surface of the first lens layer 22. In the former case, the fixing member 356 as the positioning member of the second mold 52 is set to have two surfaces according to the inclined surface and the vertical surface of the first lens layer 22, and by performing positioning using the inclined surface and the vertical surface, it is possible to more reliably perform alignment in an eccentric direction. Particularly, as shown in FIG. 13(B), in a case where a part between the vertical surface and the inclined surface and a part between the inclined surface and a horizontal surface are the round chamfered shape, since the fixing member 356 is also set to be the shape according thereto, it is easy to insert the first lens layer 22 to the fixing member 356 of the second mold 52, and easy to prevent damage by bringing the second lens layer 22 contact with the second mold 52. In the latter case (FIG. 13(C)), there is no angled portion on the part using for the positioning of the second lens layer 22, and by setting the fixing member 356 to have a shape according thereto, it is easy to insert the second lens layer 22 to the fixing member 356 and easy to prevent damage on the second lens layer 22. In addition, instead of these, as described in the first embodiment, the inclined surface formed to be adjacent to the outer periphery of the optical surface may be used or the inclination of the peripheral edge portion of the optical surface may be used.

Sixth Embodiment

In the following, a method for manufacturing an image pickup lens unit according to a sixth embodiment will be described. The method for manufacturing the image pickup lens unit according to the sixth embodiment is achieved by changing some parts of the method for manufacturing the image pickup lens unit 100 according to the first embodiment, and parts that are particularly not described are those that are the same as the first embodiment.

Figure 14:
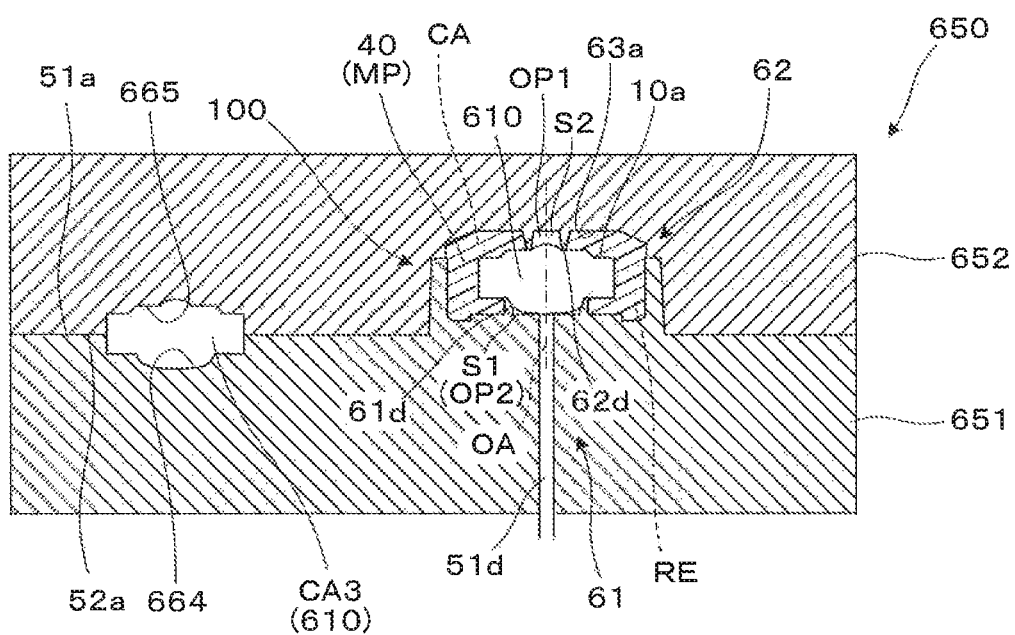
FIG. 14 is a cross-sectional view for explaining the image pickup lens unit and the method for manufacturing thereof according to a sixth embodiment.

As shown in FIG. 14, in a case of a single lens component made of resin such as a lens 610, it is possible to continuously form with a mold device 650.

The mold device 650 includes a first mold 651 which is a fixed side and a second mold 652 which is a movable side. An eighth molding portion 664 for lens molding is provided on the first mold 651, and a ninth molding portion 665 for lens molding is provided on the second mold 652. A resin inlet is provided at least one of the eighth molding portion 664 and the ninth molding portion 665. By performing mold clamping of the second mold 652 in a molding position, a cavity CA3 which is molding space for the lens 610 is formed by the eighth molding portion 664 and the ninth molding portion 665 between the first mold 651 and the second mold 652. Then, after molding the lens 610 by filling the cavity CA3 for lens molding with the molten resin (fluid resin) MP and solidifying, the lens 610 is separated from the first mold, the second mold 652 is removed in a state where the lens 610 is held in the second mold 652, the lens 610 is separated from the second mold. 652 using an ejecting mechanism not shown on the first molding portion 61, and the lens 610 is fitted into the depression RE of the first molding portion 61. At that time, it is preferable to provide a mechanism which holds the lens 610 from a side portion and to precisely guide the lens to the depression RE of the first molding portion 61. After that, by returning the second mold 652 to the original molding position to perform mold clamping again, and filling the cavity CA with the molten resin (fluid resin) MP and solidifying, the holder member 40 is molded. Accordingly, the image pickup lens unit 100 in which the lens 610 is housed and fixed in the holder member 40 is manufactured. In addition, by filling the cavity CA3 with the molten resin (fluid resin) MP according to the molding of the holder member 40, it is possible to perform molding of a new lens 610 with the molding of the holder member 40. Accordingly, by repeating the steps described above, it is possible to manufacture a plurality of image pickup lens units 100 in short time. In addition, since the molding space for molding the lens 610 is provided on a portion separated from the molding space for molding the holder member 40 in the same mold, it is possible to achieve space saving of the manufacturing apparatus of the image pickup lens unit 100.

Seventh Embodiment

In the following, a method for manufacturing an image pickup lens unit according to a seventh embodiment will be described. The method for manufacturing the image pickup lens unit according to the seventh embodiment is achieved by changing some parts of the method for manufacturing the image pickup lens unit 100 according to the first embodiment, and parts that are particularly not described are those that are the same as the first embodiment.

Hereinafter, a method for manufacturing of the image pickup lens unit 100 will be described.

Figure 15:
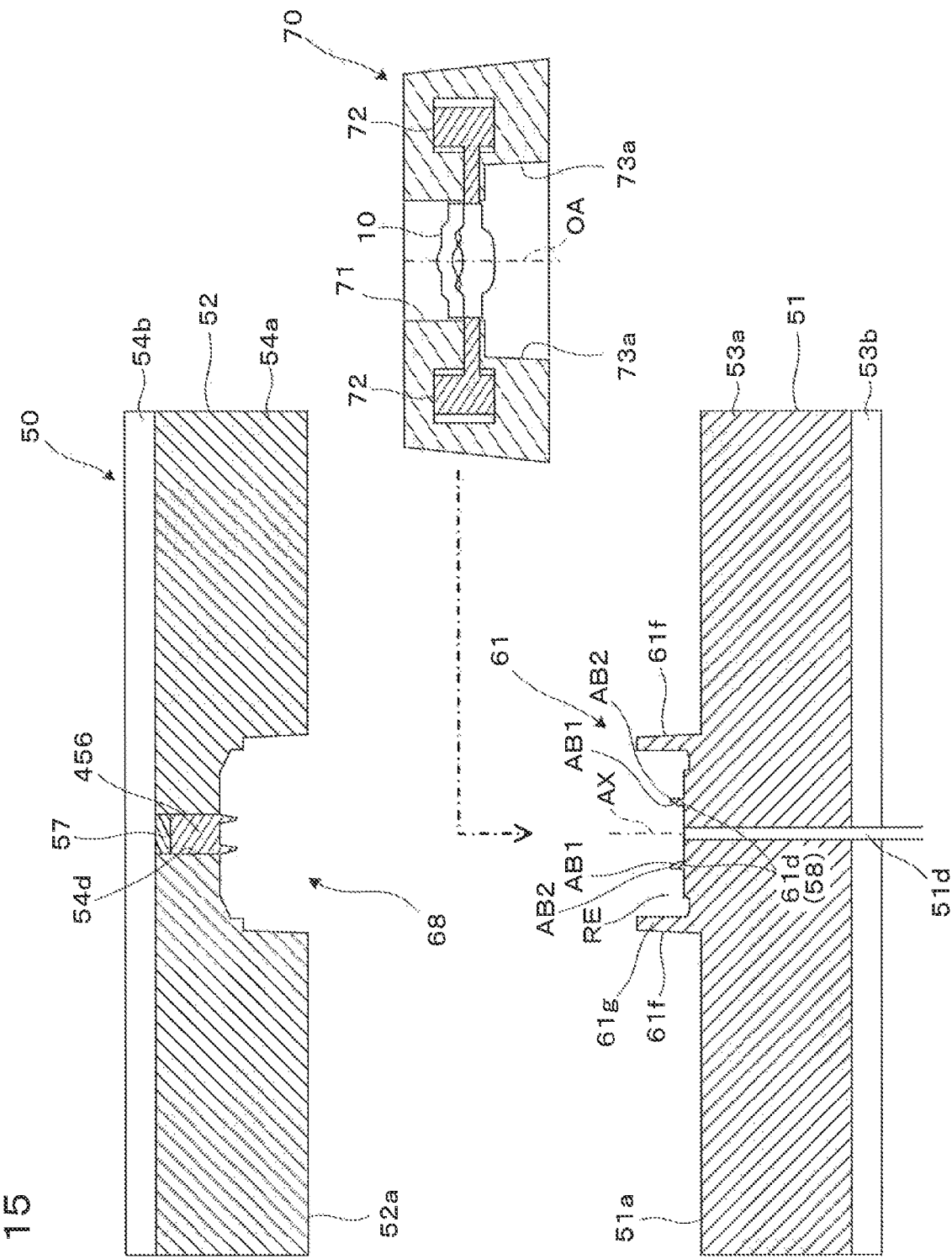
FIG. 15 is a cross-sectional view for explaining a function or the like of the insertion jig that holds a lens according to a seventh embodiment.

First, as shown in FIG. 15, by suitably operating the mold device 50 including the first mold 51 which is a fixed side and the second mold 52 which is a movable side to remove the second mold 52, both molds 51 and 52 are in an opened state, and the insertion jig 70 holding the lens 10 is moved to an upper part of the first molding portion 61 provided on the first mold 51 (step S11 of FIG. 3).

The first molding portion 61 which is a movement destination of the insertion jig 70 is provided so as to be protruded from a parting surface 51a of the first mold 51. In addition, with respect to the first molding portion 61, a tenth molding portion 68 is provided so as to be recessed from a parting surface 52a on the second mold 52 side.

The first mold 51 includes a main body 53a including the parting surface 51a and a mounting plate 53b which supports the main body 53a from the back. The second mold 52 includes a main body 54a including the parting surface 52a and a mounting plate 54b which supports the main body 54a from the back. In the second mold 52, a fixing member 456 which will be described later is embedded in the center of the tenth molding portion 68. The fixing member 456 is embedded in a hole 54d which is formed on the main body 54a of the second mold 52, and the rear surface of the fixing member 456 is supported by the mounting plate 54b through an elastic body 57. Each portion of the first mold 51 and the second mold 52 except the elastic body 57 is formed of a hard material such as metal or ceramics (same in each embodiment which will be described later). Accordingly, in a case of receiving pressure from a direction perpendicular to the parting surface 52a, the fixing member 456 is elastically and slightly displaced with respect to the main body 54a, and in a case of not receiving pressure, the fixing member returns to the original position. The elastic body 57 can be formed with an elastic material formed of rubber or other resin, but can also be formed with an elastic member such as spring.

Figure 16:
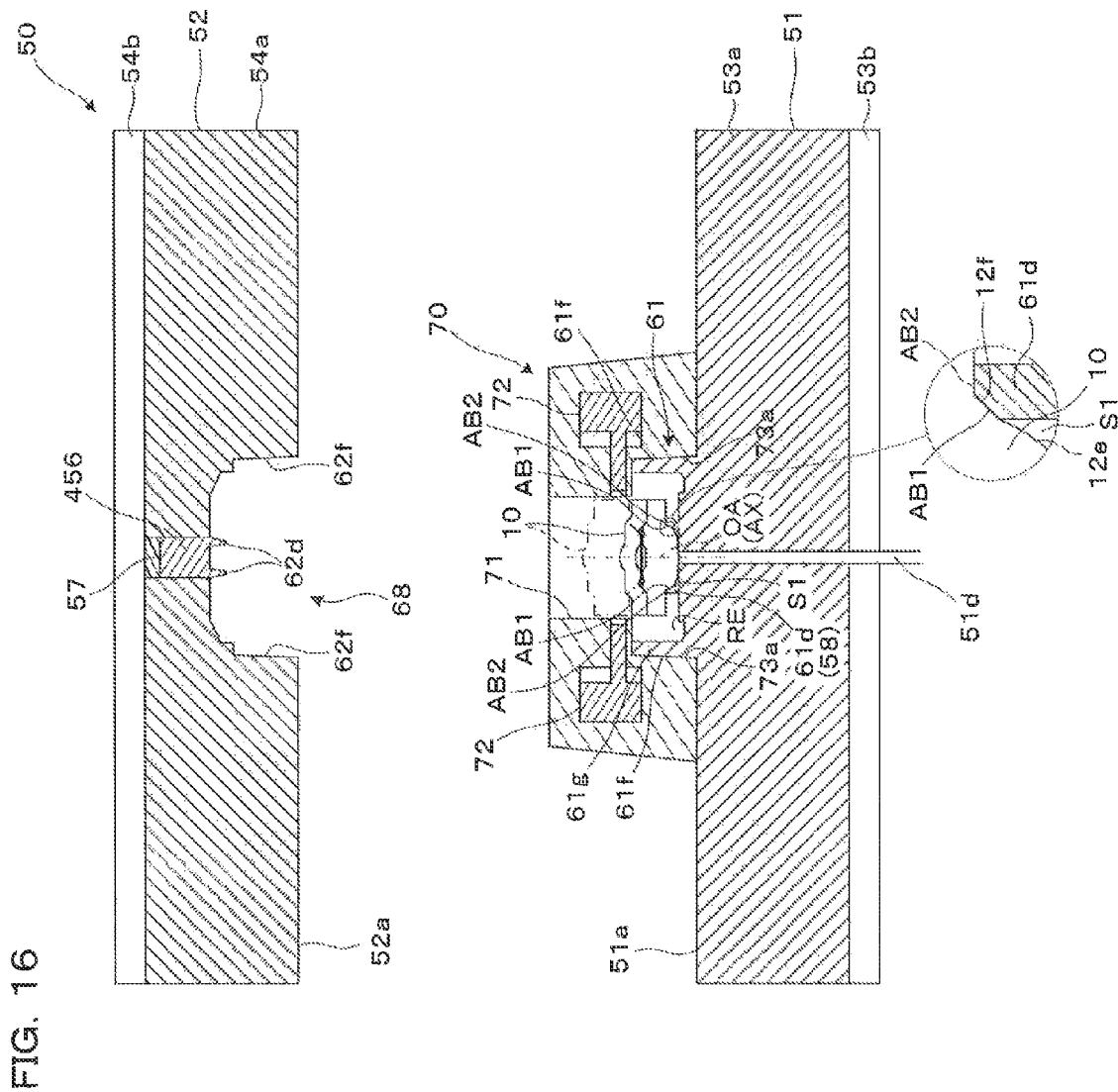
FIG. 16 is a cross-sectional view for explaining the setting of the lens in the fixed mold by the insertion jig according to a seventh embodiment.

Next, as shown in FIG. 16, the insertion jig 70 is dropped down to the first mold 51 and the fitting surface 73a on the inner side of the lower portion of the insertion jig 70 is fitted with the fitting surface 61f of the fitting member 61g which stands by attaching a taper on the first molding portion 61. In this state, when the insertion jig 70 is switched to a released state, the lens 10 in which the grip by the chuck member 72 is released is moved down and is inserted into the depression RE of the first molding unit 61, and is held in a state of being aligned in the depression RE (installing step; step S12 of FIG. 3).

Figure 17:
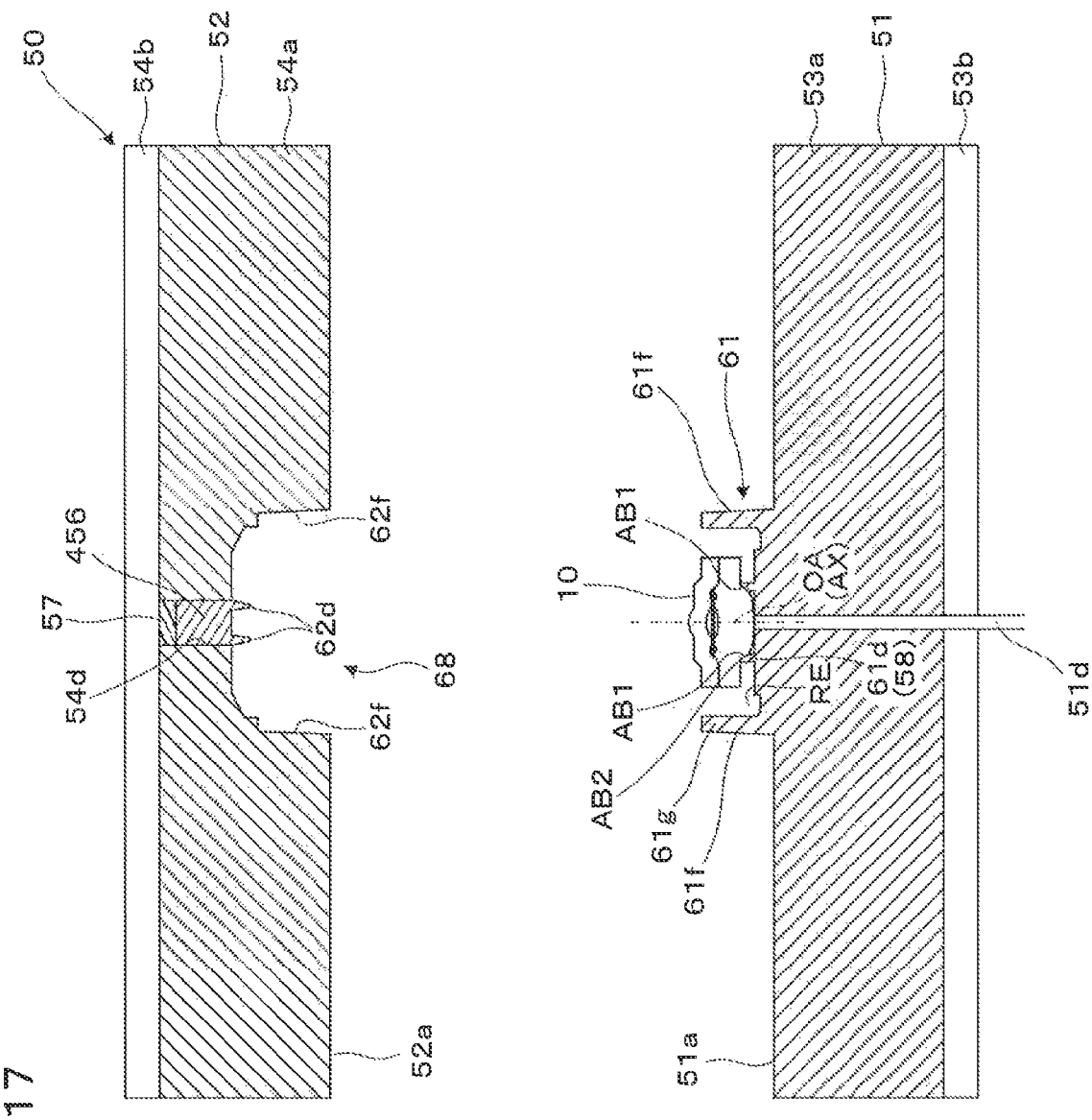
FIG. 17 is a cross-sectional view for explaining after removing the insertion jig according to a seventh embodiment.

After that, as shown in FIG. 17, the insertion jig 70 is removed from the first mold 51 (step S13 of FIG. 3)

Figure 18A:
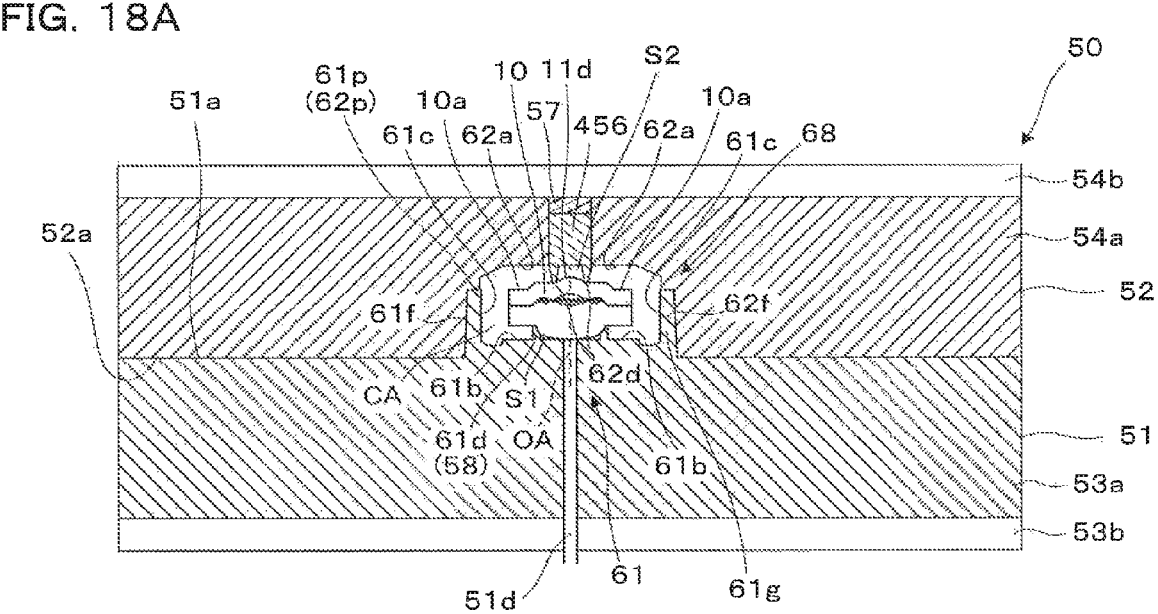
FIG. 18(A) is a cross-sectional view for explaining the formation of the cavity in the manufacturing apparatus according to a seventh embodiment.

Next, as shown in FIG. 18(A), by moving the second mold 52 to perform mold clamping, the cavity CA for the holder member 40 is formed between the first mold 51 and the second mold 52 (step S14 of FIG. 3). At that time, the first molding portion 61 provided on the first mold 51 and the tenth molding portion 68 provided on the second mold 52 are fitted to each other. Herein, the transfer surfaces 61b and 61c each of which for molding the rear surface 40b and the outer peripheral side surface 40c of the holder member 40 shown in FIG. 1 are formed on the first molding portion 61. In addition, the transfer surface 62a for molding the upper surface 40a or the like of the holder member 40 is formed on the tenth molding portion 68 on the second mold 52 side. Further, the fixing member 56 which includes the columnar protrusion 62d is formed on the tenth molding portion 68, and can be elastically and slightly displaced in a direction perpendicular to the parting surface 52a. Accordingly, the protrusion 62d comes into intimate contact with the innermost peripheral portion of the frame portion 11b of the lens 10. The protrusion 62d prevents flow of the fluid resin MP to the space S2 which is adjacent to the optical surface 11d of the lens 10. In addition, when forming the cavity CA as a molding space by the mold clamping, by contacting the innermost peripheral portion of the frame portion 11b of the lens 10 and softly pressing the lens 10 downward, the protrusion 62d stabilizes the lens 10 in the cavity CA and prevents from the generation of play.

Figure 18B:
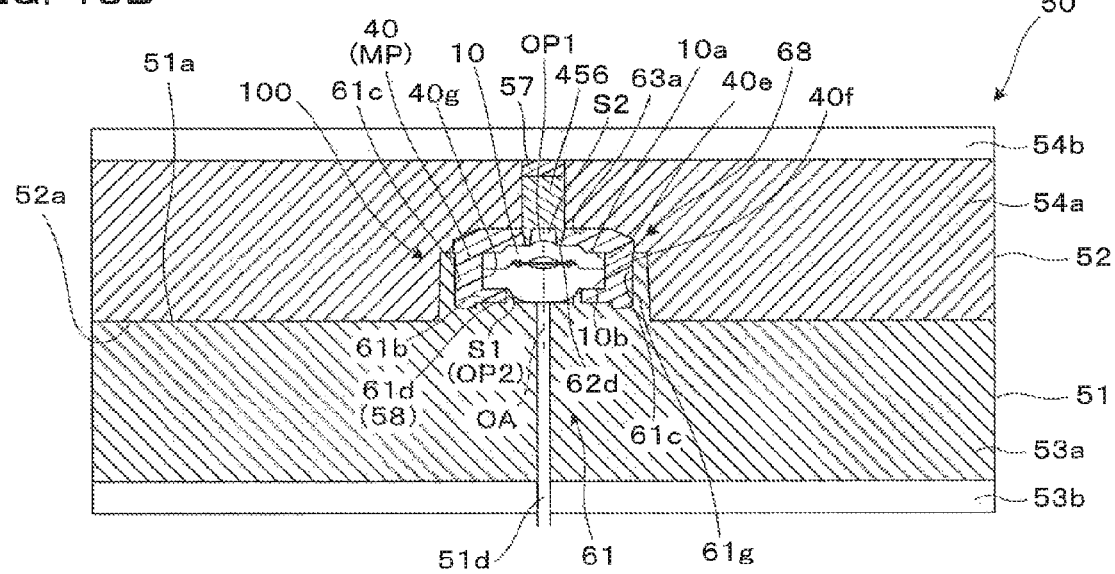
FIG. 18(B) is a cross-sectional view for explaining the molding of a holder member.

Next, as shown in FIG. 18(B), by filling the cavity CA which is the molding space with the fluid resin MP which is to be a material of the holder member 40, each of a lower surface of the frame portion 12b of the second lens element 12, the side surface 10c of the lens 10, and an upper surface of the frame portion 11b of the first lens element 11 is covered with the resin. Then, by performing solidification with temperature control, the holder member 40 is molded (molding step; step S15 of FIG. 3).

Accordingly, the image pickup lens unit 100 in which the lens 10 is housed and fixed in the holder member 40 in a state where the lens 10 is supported between the openings OP1 and OP2 of the holder member 40 as shown in FIG. 1 is manufactured.

Figure 19A:
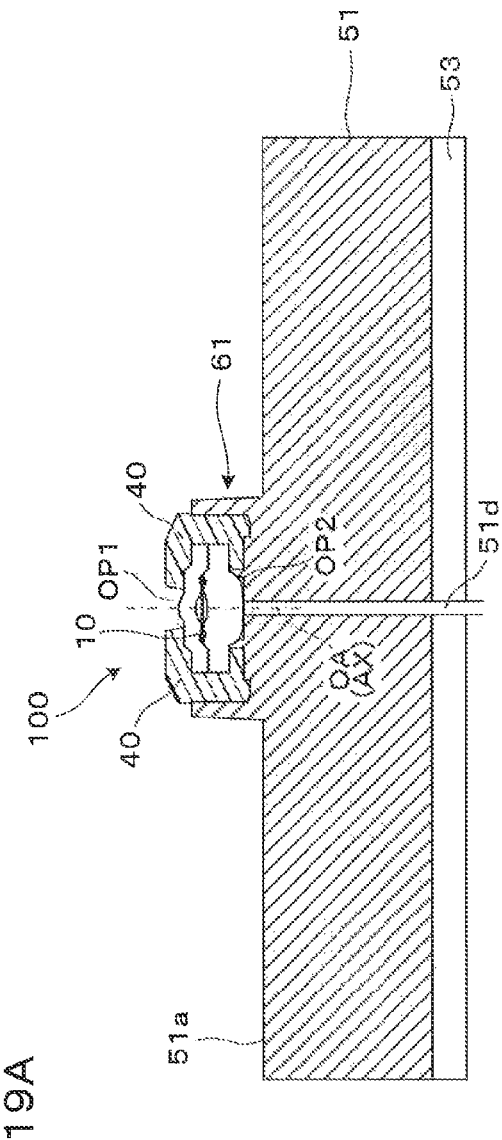
FIG. 19(A) is a cross-sectional view for explaining the mold opening in the manufacturing apparatus according to a seventh embodiment.
Figure 19B:
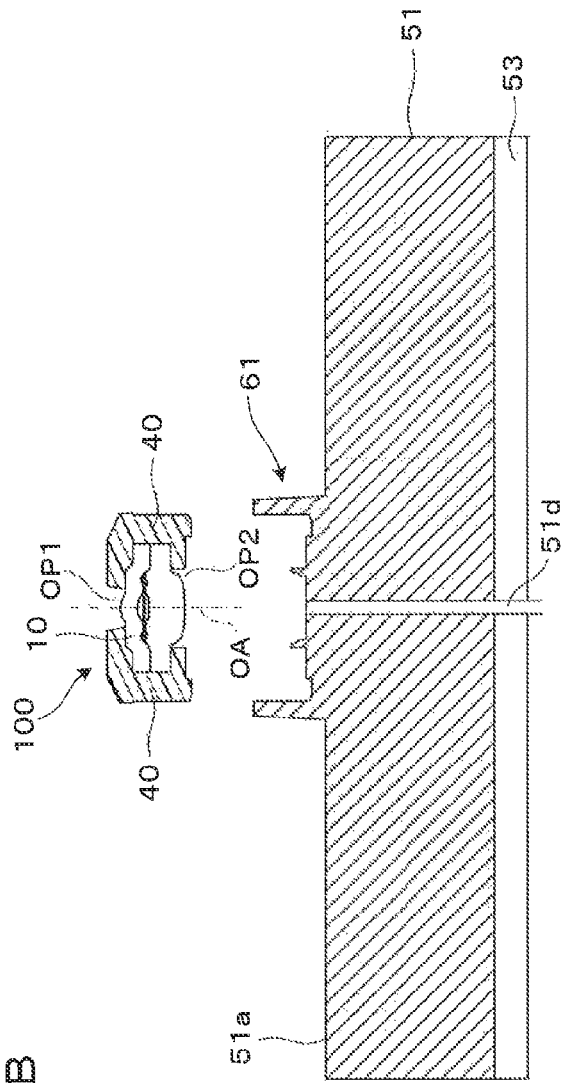
FIG. 19(B) is a cross-sectional view for explaining the extraction of the image pickup lens unit.

Then, as shown in FIG. 19(A), by removing the second mold 52 by the mold opening which separates the second mold 52 from the first mold 51 (step S16 of FIG. 3), and, as shown in FIG. 19(B), by projecting and mold releasing the image pickup lens unit 100 using an ejector pin (not shown) or the like provided on the first mold 51, it is possible to extract the image pickup lens unit 100 as a completed product from the first mold 51 (step S17 of FIG. 3).

According to the method for manufacturing the image pickup lens unit 100 of the seventh embodiment, in the installing step, the lens 10 is positioned by the holding member 58 provided in a position corresponding to the opening OP2 by the mold 51. Accordingly, it is possible to cover the entire side surface of the lens 10 with the resin without interrupting the molding of the holder member 40 at a portion corresponding to the side surface 10c of the lens 10, and it is possible to reliably fix the lens 10 in the molds 51 and 52. Thus, it is possible to avoid the deterioration of the dimension accuracy due to the remaining large positioning shape on the holder member 40. In addition, since the holder member 40 is integrally molded in a state of fixing the lens 10, it is possible to reliably perform molding and fixing of the holder member 40 collectively, and to avoid an increase of the number of components used for the assembling the holder, and it is not necessary to configure the holder member by joining the plurality of components to each other. It is possible to perform the positioning of the lens 10 with the holding member 58. Thus, it is not necessary to install an image recognition device or to provide a positioning mechanism on a mold device, and it is possible to easily provide a high-accuracy manufacturing apparatus of the image pickup lens unit 100. Further, according to the method for manufacturing of the embodiment, when fixing the lens 10 with respect to the molds 51 and 52, since the lens 10 and the molds 51 and 52 abut to or come into contact with each other by an elastic biasing force by the fixing member 456, it is possible to suppress an impact on the lens 10 and to reduce damage, deformation, or the like of the lens 10.

Eighth Embodiment

In the following, a method for manufacturing an image pickup lens unit according to an eighth embodiment will be described. The method for manufacturing the image pickup lens unit according to the eighth embodiment is achieved by changing some parts of the method for manufacturing the image pickup lens unit 100 according to the first embodiment, and parts that are particularly not described are those that are the same as the first embodiment.

Figure 20A:
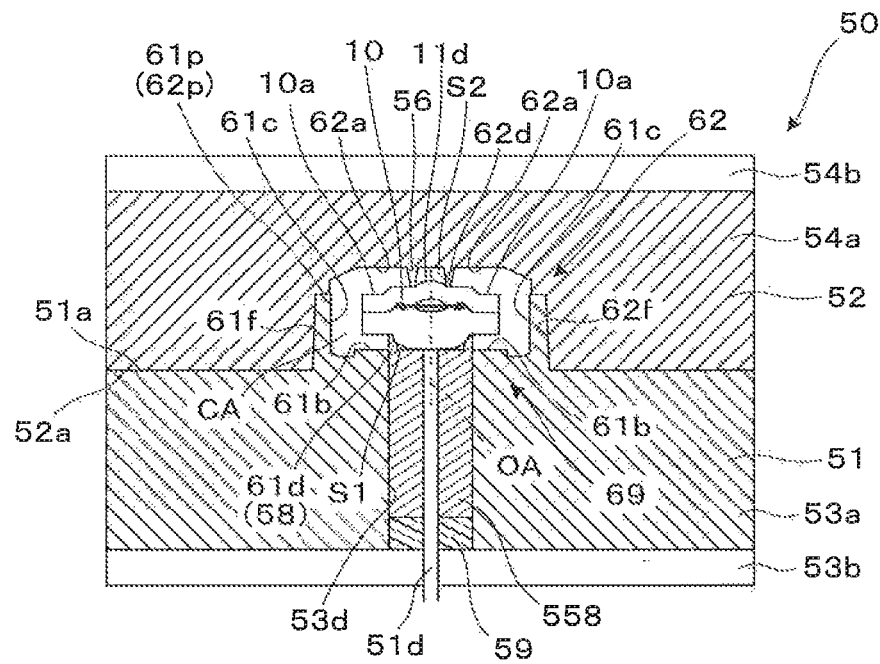
FIGS. 20(A) and 20(B) are cross-sectional views for explaining the method for manufacturing the image pickup lens unit according to an eighth embodiment.
Figure 20B:
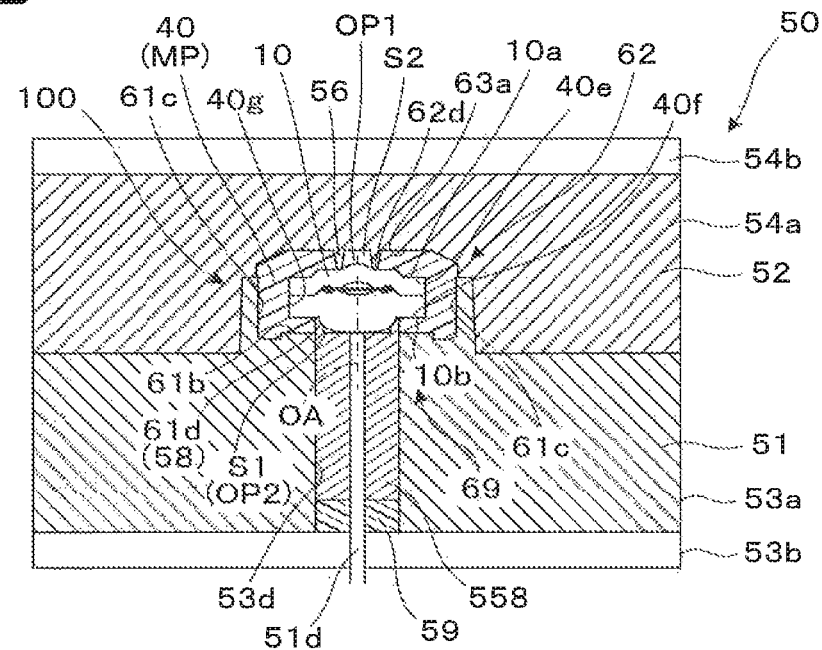

As shown in FIGS. 20(A) and 20(B), in the first mold 51, a holding member 558 is embedded in the center of an eleventh molding portion 69. A holding member 558 is embedded in a hole 53d formed on the main body 53a of the first mold 51, and the rear surface of the holding member 558 is supported by the mounting plate 53b through the elastic body 59. Accordingly, in a case of receiving pressure from a direction perpendicular to the parting surface 51a, the fixing member 558 is elastically and slightly displaced with respect to the main body 53a, and in a case of not receiving pressure, the fixing member returns to the original position. The elastic body 59 can be formed with an elastic material formed of rubber or other resin, but can also be formed with an elastic member such as spring.

The lens 10 which is transported by the insertion jig 70 and inserted into the eleventh molding portion 69 of the first mold 51 is supported by the columnar protrusion 61d provided on the upper part of the holding member 558 and is positioned in the lateral direction. That is, the holding member 558 is a positioning member which precisely positions the lens 10 regarding a direction perpendicular to the optical axis OA.

As shown in FIG. 20(A), when performing mold clamping of the first mold 51 and the second mold 52 to form the cavity CA for the holder member 40 therebetween, the fixing member 56 provided on the second molding portion 62 of the second mold 52 presses the lens 10 on the holding member 558 down. Herein, since the holding member 558 can be elastically and slightly displaced in a direction perpendicular to the parting surface 52a, the impact due to the abutting of the fixing member 56 is alleviated, the protrusion 61d of the holding member 558 comes into intimate contact with the outermost peripheral portion of the optical surface 12e of the lens 10 (or innermost peripheral portion of the frame portion 12b or the vicinity thereof), and the protrusion 62d of the fixing member 56 comes into intimate contact with the innermost peripheral portion of the frame portion 11b of the lens 10. That is, it is possible to stabilize the lens 10 in the cavity CA and to prevent from the generation of play without damaging the lens 10.

In addition, in the embodiment, as the holding member 558 of the first mold 51, in the second mold 52, the fixing member 56 may be embedded as a separated member. In this case, in the same manner as the first embodiment, the rear surface of the fixing member 56 is supported by the mounting plate 54b through the elastic body.

In the method for manufacturing the image pickup lens unit 100 according to the first and second embodiments, since the elastic bodies 57 and 59 provided on the back of the fixing member 56 or the holding member 558 and the molds 51 and 52 formed of a hard material directly comes into contact with the surface of the lens 10, it is easy to reliably perform positioning.

Ninth Embodiment

In the following, a method for manufacturing an image pickup lens unit according to the ninth embodiment will be described. The method for manufacturing the image pickup lens unit according to the ninth embodiment is achieved by changing some parts of the method for manufacturing the image pickup lens unit 100 according to the first embodiment, and parts that are particularly not described are those that are the same as the first embodiment.

Figure 21A:
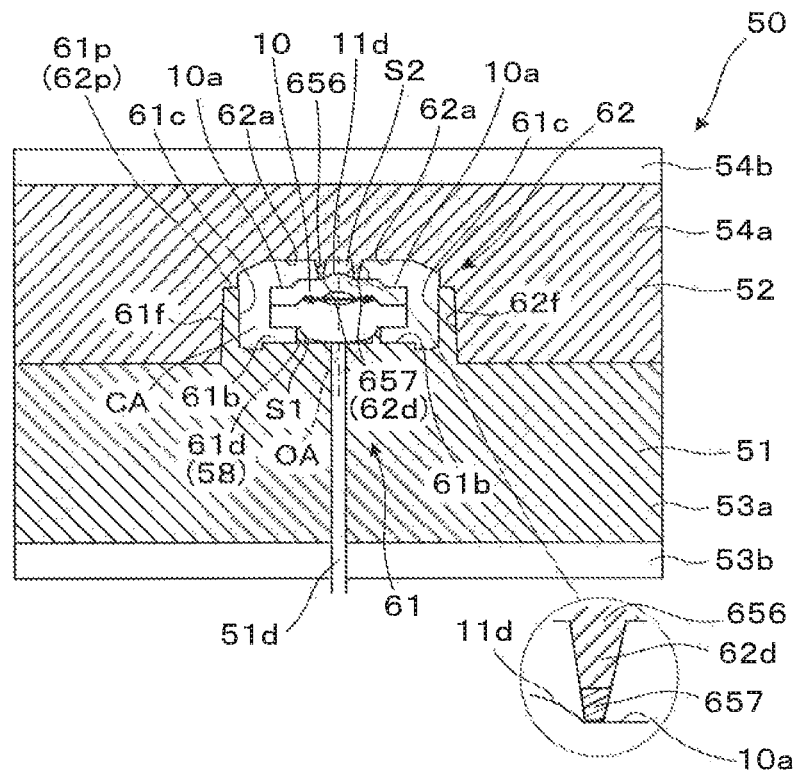
FIGS. 21(A) and 21(B) are cross-sectional views for explaining the method for manufacturing the image pickup lens unit according to a ninth embodiment.
Figure 21B:
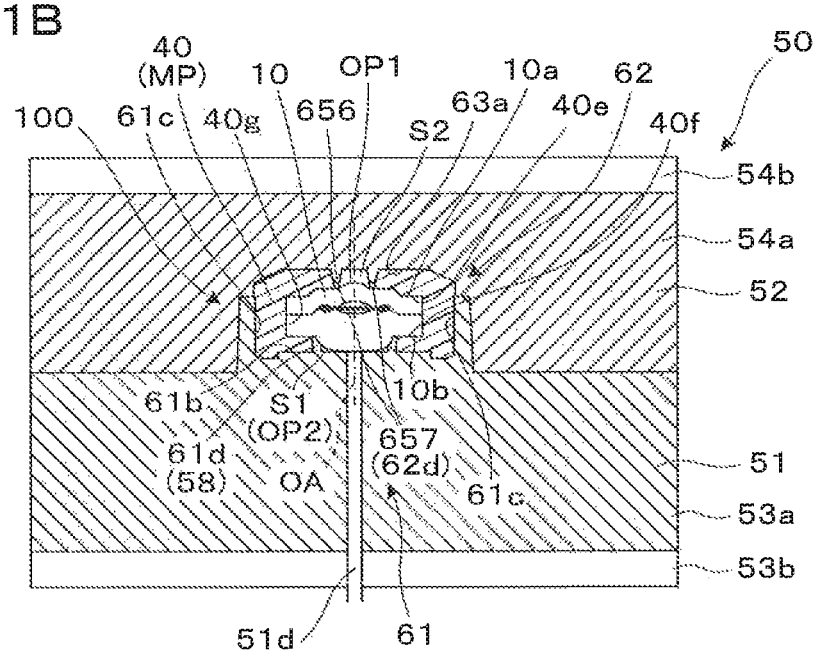

As shown in FIGS. 21(A) and 21(B), in the second mold 52, a fixing member 656 provided on the second molding portion 62 is formed from the columnar protrusion 62d, an elastic body layer 657 is attached on the end of the protrusion 62d. The elastic body layer 657 has not only elasticity, but also heat resistance or chemical durability so as not to be deformed or deteriorated by heat of the fluid resin MP.

As shown in FIG. 21(A) and others, when performing mold clamping of the first mold 51 and the second mold 52 to form the cavity CA for the holder member 40 therebetween, the fixing member 656 provided on the second molding portion 62 of the second mold 52 presses the lens 10 on the holding member 58 down. Herein, since the elastic body layer 657 provided on the protrusion 62d of the fixing member 656 can be elastically and slightly deformed, the impact due to the abutting of the fixing member 656 is alleviated, the protrusion 61d of the holding member 58 on the first molding portion 61 side comes into intimate contact with the innermost peripheral portion of the frame portion 12b of the lens 10, and the protrusion 62d of the fixing member 656 comes into intimate contact with the outermost peripheral portion of the optical surface 11d of the lens 10 (or the innermost peripheral portion of the frame portion 11b or the vicinity thereof). That is, it is possible to stabilize the lens 10 in the cavity CA and to prevent from the generation of play without damaging the lens 10.

In the embodiment, as in the same manner as the fixing member 656, the elastic body may be attached to the end of the protrusion 61d of the holding member 58.

Tenth Embodiment

In the following, a method for manufacturing an image pickup lens unit according to a tenth embodiment will be described. The method for manufacturing the image pickup lens unit according to the tenth embodiment is achieved by changing some parts of the method for manufacturing the image pickup lens unit 100 according to the first embodiment, and parts that are particularly not described are those that are the same as the first embodiment.

Figure 22A:
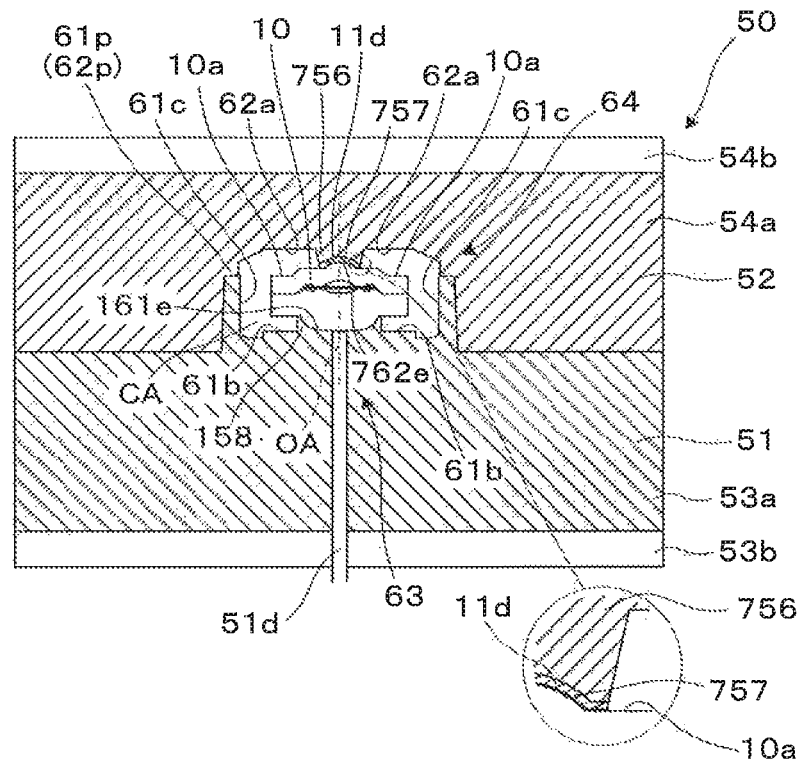
FIGS. 22(A) and 22(B) are cross-sectional views for explaining the method for manufacturing the image pickup lens unit according to a tenth embodiment.
Figure 22B:
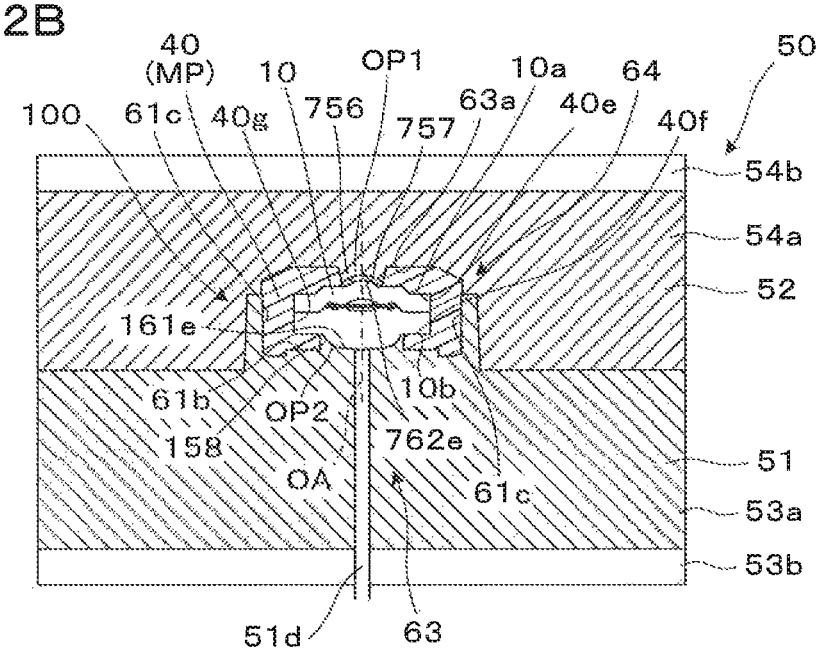

As shown in FIGS. 22(A) and 22(B), in the first mold 51, the holding member 158 provided on the third molding portion 63 is a columnar protrusion, and is configured so that the end surface 161e which is the contact surface has the same or almost the same curvature as the optical surface 12e (see FIG. 1) of the lens 10. In addition, in a case where the curvature thereof is not same as the optical surface 12e or in a case of an aspheric shape, the end surface 161e is set to have the same or almost the same shape as the optical surface 12e.

In the second mold 52, the fixing member 756 provided on the fourth molding portion 64 is a columnar protrusion, and is configured so that an end surface 762e which is the contact surface has the same or almost the same curvature as the optical surface 11d of the lens 10. Further, the end surface 762e is formed by an elastic body layer 757, and is configured so as to come into intimate contact with the optical surface 11d of the lens 10.

As shown in FIG. 22(A) and others, when performing mold clamping of the first mold 51 and the second mold 52 to form the cavity CA for the holder member 40 therebetween, the fixing member 756 provided on the fourth molding portion 64 of the second mold 52 presses the lens 10 on the holding member 758 down. Herein, since the elastic body layer 757 which forms the end surface 762e of the fixing member 756 can be slightly deformed, the impact due to the abutting of the fixing member 756 is alleviated, the end surface 161e of the holding member 158 on the third molding portion 63 side comes into intimate contact with the optical surface 12e of the lens 10, and the end surface 762e of the fixing member 756 comes into intimate contact with the optical surface 11d of the lens 10. That is, it is possible to stabilize the lens 10 in the cavity CA and to prevent from the generation of play without damaging the lens 10.

In a case of the embodiment, since the end surface 161e of the holding member 158 comes into intimate contact as a surface with the optical surface 12e of the lens 10, the fluid resin MP can be prevented from leaking to the optical surface 12e. As a result, the opening OP2 can be formed in the holder member 40. In addition, since the end surface 762e of the fixing member 756 comes into intimate contact with the optical surface 11d of the lens 10, the fluid resin MP can be prevented from leaking to the optical surface 11d. As a result, the opening OP1 can be formed in the holder member 40.

In the embodiment, in the same manner as the elastic body layer 757 of the fixing member 756, an elastic body layer may be provided on the holding member 158.

Eleventh Embodiment

In the following, a method for manufacturing an image pickup lens unit according to the eleventh embodiment will be described. The method for manufacturing the image pickup lens unit according to the eleventh embodiment is achieved by changing some parts of the method for manufacturing the image pickup lens unit 100 according to the first embodiment, and parts that are particularly not described are those that are the same as the first embodiment.

Figure 23A:
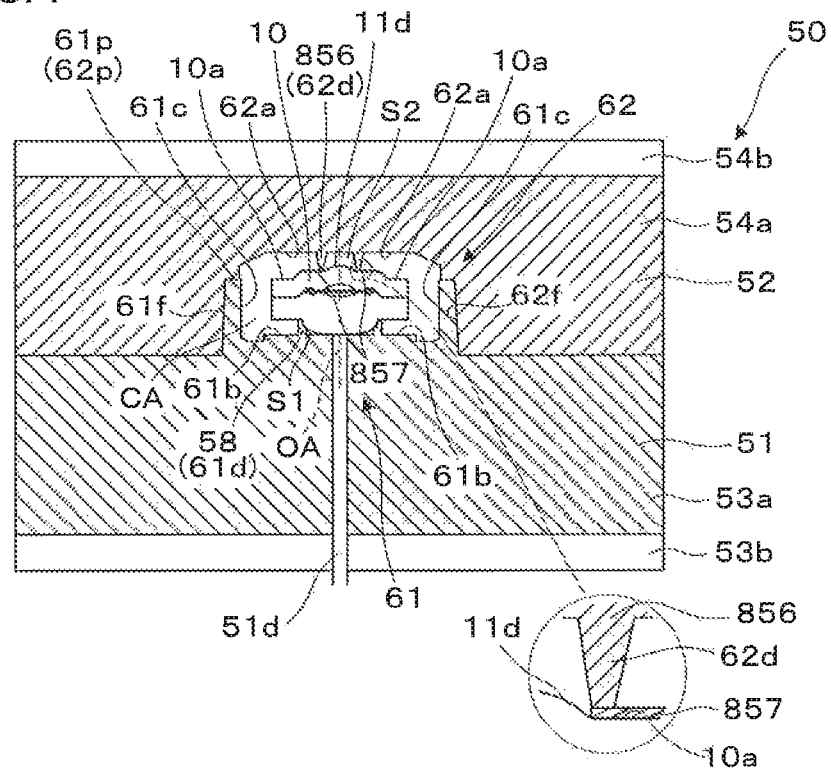
FIGS. 23(A) and 23(B) are cross-sectional views for explaining the method for manufacturing the image pickup lens unit according to an eleventh embodiment.
Figure 23B:
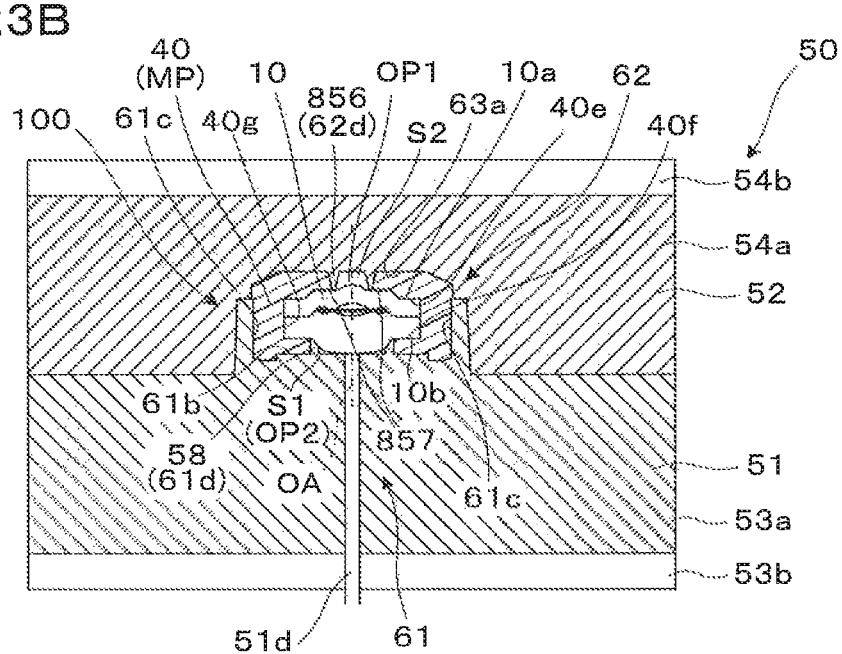

As shown in FIGS. 23(A) and 23(B), a bracelet-shaped elastic body layer 857 is attached to the surface of the vicinity of the outer edge of the optical surface 11d of the lens 10. The elastic body layer 857 has not only elasticity, but also heat resistance or chemical durability so as not to be deformed or deteriorated by heat of the fluid resin MP.

As shown in FIG. 23(A) and others, when performing mold clamping of the first mold 51 and the second mold 52 to form the cavity CA for the holder member 40 therebetween, a fixing member 856 provided on the second molding portion 62 of the second mold 52 presses the lens 10 on the holding member 58 downward. Herein, the elastic body layer 857 is interposed between the protrusion 62d of the fixing member 856 and the frame portion 11b of the lens 10. Accordingly, the impact due to the abutting of the fixing member 856 is alleviated, the protrusion 61d of the holding member 58 on the first molding portion 61 side comes into intimate contact with the outermost peripheral portion of the optical surface 12e of the lens 10 (or innermost peripheral portion of the frame portion 12b or the vicinity thereof), and the protrusion 62d of the fixing member 856 comes into intimate contact with the innermost peripheral portion of the frame portion 11b of the lens 10 over the elastic body layer 857. That is, it is possible to stabilize the lens 10 in the cavity CA and to prevent from the generation of play without damaging the lens 10.

In addition, in the embodiment, in the same manner as the elastic body layer 857 provided on the vicinity of the outer edge of the optical surface 11d on the fixing member 856 side, an elastic body layer may be provided on the vicinity of the outer edge of the optical surface 12e on the holding member 58 side.

In the method for manufacturing the image pickup lens units 100 according to the ninth to eleventh embodiments, since the molds 51 and 52 formed of a hard material comes into contact with the surface of the lens 10 through the elastic body layer 657 or the elastic body layers 757 and 857, it is possible to further reduce probability of occurring the damage on the lens 10.

Twelfth Embodiment

In the following, a method for manufacturing an image pickup lens unit according to a twelfth embodiment will be described. The method for manufacturing the image pickup lens unit according to the twelfth embodiment is achieved by changing some parts of the method for manufacturing the image pickup lens unit 100 according to the first embodiment, and parts that are particularly not described are those that are the same as the first embodiment.

Figure 24A:
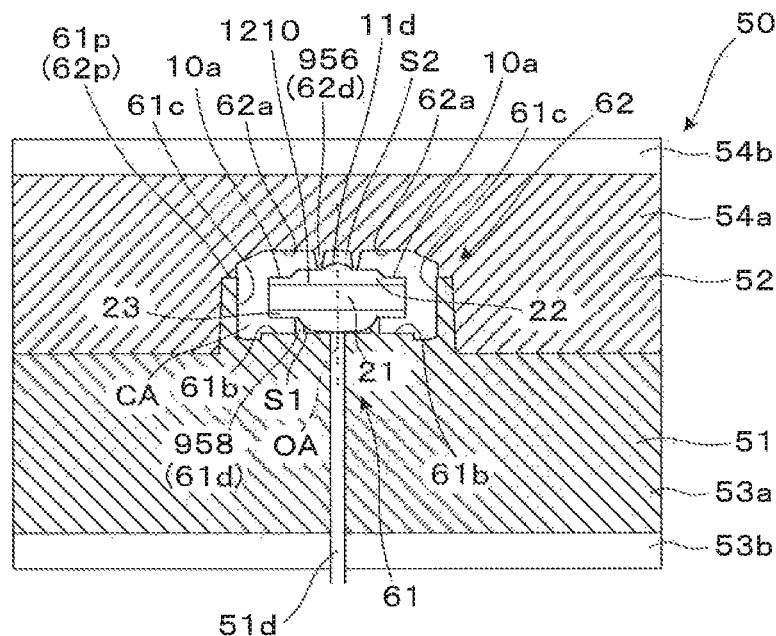
FIGS. 24(A) and 24(B) are cross-sectional views for explaining the method for manufacturing the image pickup lens unit according to a twelfth embodiment.
Figure 24B:
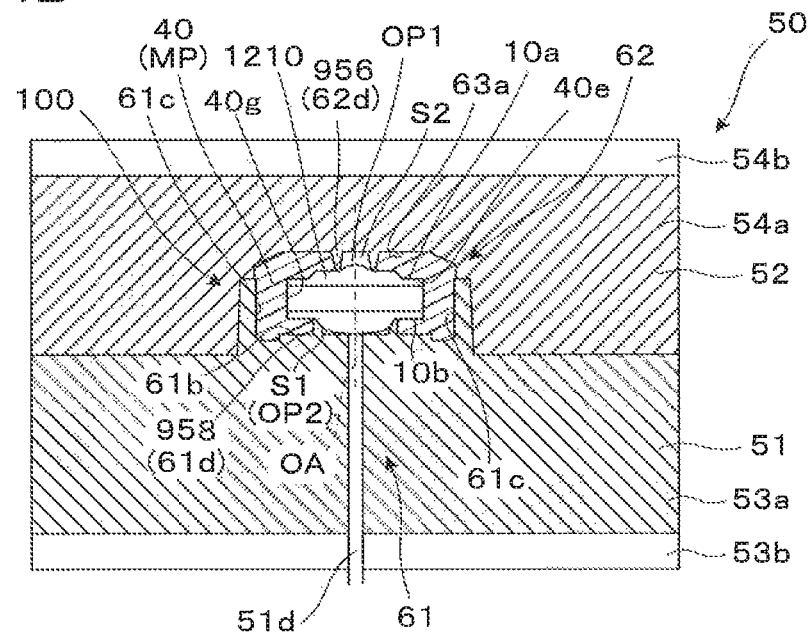

As shown in FIGS. 24(A) and 24(B), a lens 1210 is a composite lens in which the glass substrate 21 is interposed between the first lens layer 22 and the second lens layer 23 which are formed of a resin. The first lens layer 22 and the second lens layer 23 have elasticity, and have heat resistance or chemical durability so as not to be deformed or deteriorated by heat of the fluid resin MP.

In the embodiment, a holding member 958 of the first molding portion 61 of the first mold 51 supports the outermost peripheral portion of the optical surface 12e of the lens layer 23 (or the innermost peripheral portion of the frame portion 12b or the vicinity thereof), and a fixing member 956 of the second molding portion 62 of the second mold 52 positions a lens 1210 by coming into contact with the frame portion 11b of the first lens layer 22.

As shown in FIG. 24(A) and others, when performing mold clamping of the first mold 51 and the second mold 52 to form the cavity CA for the holder member 40 therebetween, the fixing member 956 provided on the second molding portion 62 of the second mold 52 presses the lens 1210 on the holding member 958 downward. Herein, the second lens layer 23 has elasticity, the protrusion 61d of the holding member 958 on the first molding portion 61 comes into intimate contact with the outermost peripheral portion of the optical surface 12e of the lens 1210 (or the innermost peripheral portion of the frame portion 12b or the vicinity thereof). Since the first lens layer 22 has elasticity, the protrusion 62d of the fixing portion 956 on the second molding portion 62 side comes into intimate contact with the innermost peripheral portion of the frame portion 11b of the lens 1210. That is, it is possible to stabilize the lens 1210 in the cavity CA and to prevent from the generation of play without damaging the lens 1210.

Thirteenth Embodiment

In the following, a method for manufacturing an image pickup lens unit according to a thirteenth embodiment will be described. The method for manufacturing the image pickup lens unit according to the thirteenth embodiment is achieved by changing some parts of the method for manufacturing the image pickup lens unit 100 according to the first embodiment, and parts that are particularly not described are those that are the same as the first embodiment.

Figure 25A:
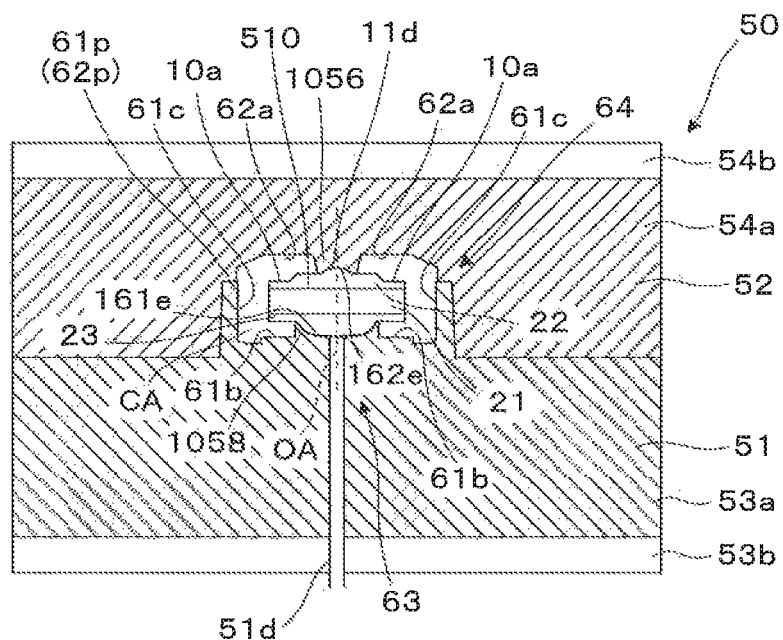
FIGS. 25(A) and 25(B) are cross-sectional views for explaining the method for manufacturing the image pickup lens unit according to a thirteenth embodiment.
Figure 25B:
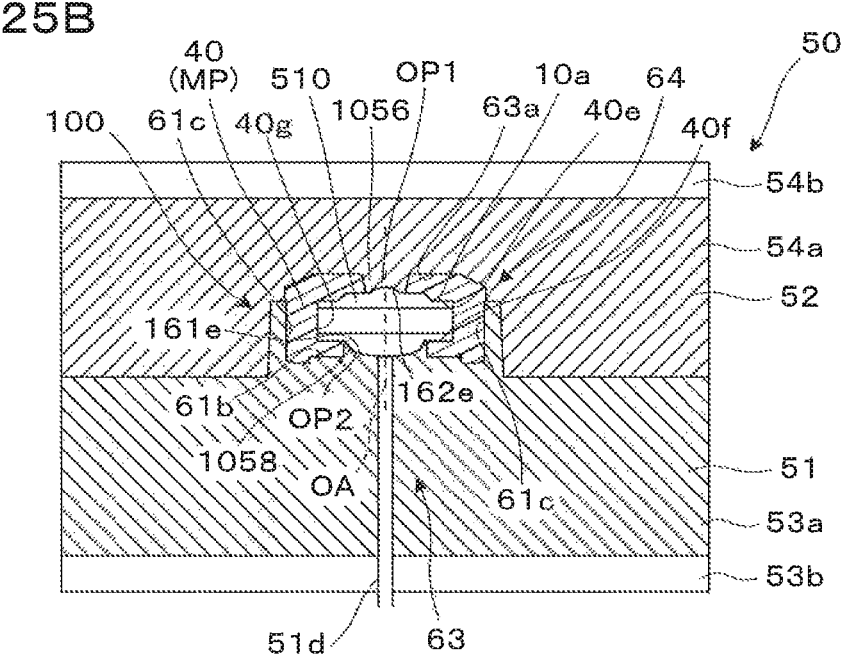

As shown in FIGS. 25(A) and 25(B), the lens 1210 is a composite lens in which the glass substrate 21 is interposed between the first lens layer 22 and the second lens layer 23 which are formed of a resin, as in the same manner as the case of the twelfth embodiment.

In the first mold 51, a holding member 1058 provided on the third molding portion 63 is a columnar protrusion, and is configured so that the end surface 161e which is the contact surface has the same or almost the same curvature as the optical surface 12e (see FIG. 1) of the lens 1210.

In the second mold 52, a fixing member 1056 provided on the fourth molding portion 64 is a columnar protrusion, and is configured so that the end surface 162e which is the contact surface has the same or almost the same curvature as the optical surface 11d of the lens 1210. In addition, in a case where the curvature thereof is not same as the optical surfaces 11d and 12e or in a case of an aspheric shape, the end surfaces 162e and 161e are set to have the same or almost the same shape as the optical surfaces 11d and 12e.

As shown in FIG. 25(A) and others, when performing mold clamping of the first mold 51 and the second mold 52 to form the cavity CA for the holder member 40 therebetween, the fixing member 1056 provided on the fourth molding portion 64 of the second mold 52 presses the lens 1210 on the holding member 1058 down. Since the second lens layer 23 has elasticity, the end surface 161e of the holding member 1058 on the third molding portion 63 comes into intimate contact with the optical surface 12e of the lens 1210. Since the first lens layer 22 has elasticity, the end surface 162e of the fixing member 1056 on the fourth molding portion 64 side comes into intimate contact with the optical surface 11d of the lens 1210. That is, it is possible to stabilize the lens 1210 in the cavity CA and to prevent from the generation of play without damaging the lens 1210.

In addition, in the embodiment, one of the fixing member 1056 and the holding member 1058 may be the fixing member 956 or the holding member 958 having a protruded shape, as in the twelfth embodiment.

A method for manufacturing the image pickup lens unit 100 according to the twelfth and thirteenth embodiments can make the configurations of the molds 51 and 52 simple. However, since the impact applied on the lens 1210 is suppressed using the elasticity of the lens 1210 itself, the resin material which has suitable elasticity and which does not damage the optical property required for the lens 1210 is selected.

Fourteenth Embodiment

In the following, a method for manufacturing an image pickup lens unit according to a fourteenth embodiment will be described. The method for manufacturing the image pickup lens unit according to the fourteenth embodiment is achieved by changing some parts of the method for manufacturing the image pickup lens unit 100 according to the first embodiment, and parts that are particularly not described are those that are the same as the first embodiment.

Figure 26:
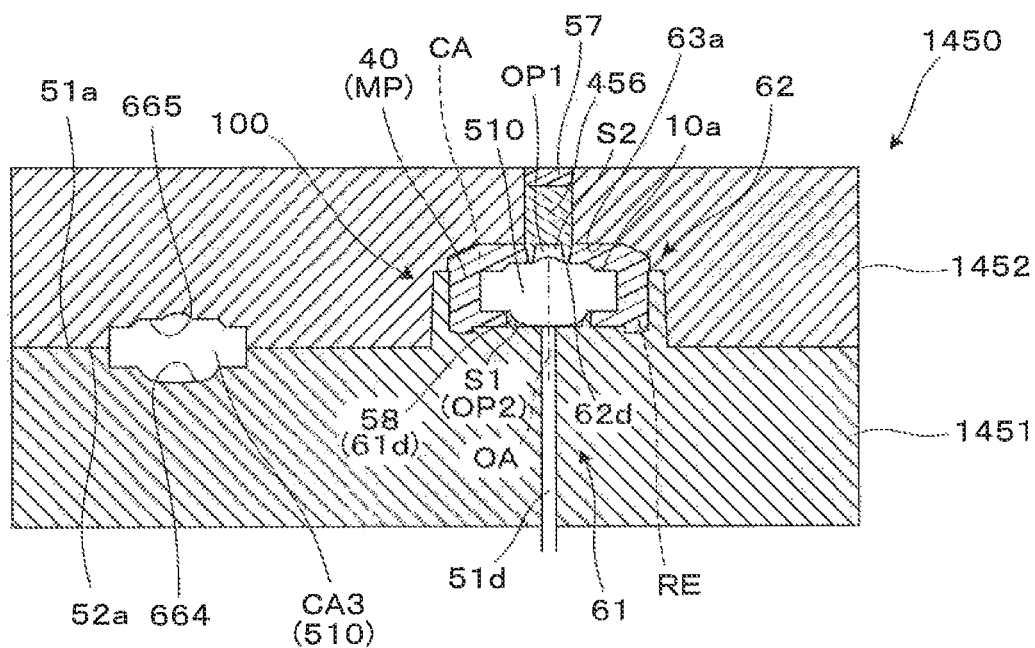
FIG. 26 is cross-sectional view for explaining the image pickup lens unit and the method for manufacturing thereof according to a fourteenth embodiment.

As shown in FIG. 26, in a case of a single lens component made of resin such as the lens 610, it is possible to continuously form with a mold device 1450.

The mold device 1450 includes a first mold 1451 which is a fixed side and a second mold 1452 which is a movable side. The eighth molding portion 664 for lens molding is provided on the first mold 1451, and the ninth molding portion 665 for lens molding is provided on the second mold 1452. The resin inlet is provided at least one of the eighth molding portion 664 and the ninth molding portion 665. By performing mold clamping of the second mold 1452 in a molding position, a cavity CA3 which is molding space for the lens 610 is formed by the eighth molding portion 664 and the ninth molding portion 665 between the first mold 1451 and the second mold 1452. Then, after molding the lens 610 by filling the cavity CA3 for lens molding with the resin and solidifying, the lens 610 is separated from the first mold 1451, the second mold 1452 is removed in a state where the lens 610 is held in the second mold 1452, the lens 610 is separated from the second mold 1452 using an ejecting mechanism not shown on the first molding portion 61, and the lens 610 is fitted into the depression RE of the first molding portion 61. At that time, it is preferable to provide a mechanism which holds the lens 610 from a side portion and to precisely guide the lens to the depression RE of the first molding portion 61. After that, by returning the second mold 1452 to the original molding position to perform mold clamping again, and filling the cavity CA with the resin and solidifying, the holder member 40 is molded. Accordingly, the image pickup lens unit 100 in which the lens 610 is housed and fixed in the holder member 40 is manufactured. In addition, by filling the cavity CA3 with the resin according to the molding of the holder member 40, it is possible to perform molding of a new lens 610 with the molding of the holder member 40. Accordingly, by repeating the steps described above, it is possible to manufacture a plurality of image pickup lens units 100 in short time. In addition, since the molding space for molding the lens 610 is provided on a portion separated from the molding space for molding the holder member 40 in the same mold, it is possible to achieve space saving of the manufacturing apparatus of the image pickup lens unit 100.

Hereinafter, the present invention has been described with the embodiments, however, the present invention is not limited to the embodiments described above. For example, in the first to fifth, and seventh to thirteenth embodiments, a single lens made of glass or a resin may be used for the lenses 10, 410, and 510.

In addition, in each embodiment, the shapes or the structures of the lenses 10, 410, 510, and 610 are the examples, and can be suitably modified.

In addition, in each embodiment, the movement of the lens is prevented by use of suction on the lenses 10, 410, 510, and 610 from the second mold side, however, if it is possible to stabilize and fix the lens 10 or the like when molding, it is not necessary to use suction on the lenses.

In each embodiment, one of the holding members 58, 158, 258, 358, 458, 558, 958, and 1058, and the fixing members 56, 156, 256, 356, 456, 656, 756, 856, 956, and 1056 is used as the positioning member, however, it is possible to suitably change which one to play a role for the positioning member, and the other can be used as the positioning member. Both can be used to be the positioning members. For example, in the first embodiment, in a case where the first lens element 11 and the second lens element 12 are separately provided and the stop 15 uses the stop which is previously formed on the first lens element 11 or the second lens element 12, as described below, it is possible to perform the positioning of the lens 10 with the holding member 58 of the first mold and the fixing member 56 of the second mold. First, after executing the steps S11 to 313 of FIG. 3 to perform the positioning of the second lens element 12, the steps S11 to S13 are executed again by changing the lens element held by the insertion jig 70. Then, by executing the step S14 of FIG. 3, that is, by setting the second mold 52 which is the movable side to the first mold 51 which is the fixed side, the positioning of the lens element 11 on the upper side is performed by the fixing member 56 of the second mold 52.

In addition, in the embodiment, the vertical mold devices 50, 650, and 1450 which move the second mold 52 in a vertical direction are used, however, a horizontal mold device which moves the mold which is the movable side in a horizontal direction may be used. In that case, it is necessary to suck and hold the lens 10 or the like from at least one of the mold to prevent the dropping of the lens 10.

In addition, in the embodiment, the thermoplastic resin is used as the resin material which configures the holder member 40, however, it is not limited thereto, and the curable resin such as a thermosetting resin, a light curable resin, or the like can be used.

In addition, in the embodiment, the molding of the holder may be performed at the same time with respect to the plurality of lenses by providing the plurality of molding portions to the mold. In that case, a member for the alignment of two molds is not necessary to be disposed on each molding portion, and it is only necessary to use a common alignment member with respect to the plurality of molding portions by providing a small number of taper pins than the number of molding portions and fitting holes to be fit thereto on each mold.

In addition, in the embodiment, the combinations of the fixing members 56, 156, 256, 356, 456, 656, 756, 856, 956, and 1056, and the holding members 58, 158, 258, 358, 458, 558, 958, and 1058 are examples, and the fixing or holding of the lens 10 with the protrusion, or the fixing or holding of the lens with the end surface can be suitably changed.

The invention claimed is:

1. A method for manufacturing an image pickup lens unit including a lens which has a first surface forming a first optical surface and a second surface forming a second optical surface on the opposite side to the first surface, and a holder member which is integrally molded for holding the lens in the inner portion in a state where the first and second optical surfaces are exposed, the method comprising:

disposing the lens in a mold having a molding space for molding the holder member;

performing positioning of the lens with respect to the mold in which a positioning member is provided so as to be in contact with the second surface of the lens by bringing the positioning member into contact with a bending part of the second surface of the lens;

fixing the lens with respect to the mold; and molding the holder member which holds the lens in the inner portion by filling the molding space of the mold with a resin and solidifying, in a state where the lens is positioned and fixed with respect to the mold by contacting the positioning member of the mold to the second surface of the lens.

2. The method for manufacturing an image pickup lens unit according to claim 1, wherein the second surface of the lens provides an inclined surface in the outer side with respect to the second optical surface, and the positioning member includes a contact surface facing the inclined surface provided on the second surface of the lens.

3. The method for manufacturing an image pickup lens unit according to claim 1, wherein the positioning member has a circular shape.

4. The method for manufacturing an image pickup lens unit according to claim 1, wherein the lens is fixed by pressing the first surface of the lens by a pressing member provided in the mold so as to be in contact with the first surface of the lens.

5. The method for manufacturing an image pickup lens unit according to claim 4, wherein the positioning of the lens with respect to the mold is performed by bringing the pressing member into contact with the bending part of the first surface of the lens.

6. The method for manufacturing an image pickup lens unit according to claim 4, wherein the pressing member has a circular shape.

7. The method for manufacturing an image pickup lens unit according to claim 4, wherein one of the positioning member and the pressing member includes a contact surface which faces an inclined surface being formed into the peripheral part next to one of the first and second optical surfaces of the lens, and the other one of the positioning member and the pressing member includes a contact surface which faces the other one of the first and second optical surfaces of the lens and has substantially the same shape as the first or the second optical surface.

8. The method for manufacturing an image pickup lens unit according to claim 1, wherein the lens and the mold are brought in contact by an elastic biasing force, when fixing the lens with respect to the mold.

9. The method for manufacturing an image pickup lens unit according to claim 8, wherein a pressing member which presses the first surface of the lens is provided in the mold, and at least one of the positioning member and the pressing member is configured to be displace elastically with respect to a main body of the mold.

10. The method for manufacturing an image pickup lens unit according to claim 8, wherein a pressing member which presses the first surface of the lens is provided in the mold, and at least one of the positioning member and the pressing member includes an elastic member configured to come into contact with at least a part of the first and second surfaces and undergo elastic deformation.

11. The method for manufacturing an image pickup lens unit according to claim 10, wherein at least one of the positioning member and the pressing member includes the elastic member which come into contact with the first or second optical surface.

12. The method for manufacturing an image pickup lens unit according to claim 8, wherein a pressing member which presses the first surface of the lens is provided in the mold, and at least one of the positioning member and the pressing member supports the first or second surface through a surface protection layer configured to coat (cover) at least a part of the first and second surfaces and undergo elastic deformation.

13. The method for manufacturing an image pickup lens unit according to claim 8,
wherein at least a part of the lens is formed by an elastic material configured to undergo elastic deformation, and
the positioning member supports at least one of the second optical surface and a remaining surface region except the second optical surface form the second surface.

14. The method for manufacturing an image pickup lens unit according to claim 8,
wherein at least a part of the lens is formed by an elastic material which is elastically deformable, and
a pressing member which presses the first surface of the lens is provided in the mold, and the pressing member supports at least one of the first optical surface and a remaining surface region except the first optical surface from the first surface.

15. The method for manufacturing an image pickup lens unit according to claim 13, wherein the first or second surface is supported by a contact surface having substantially the same shape.

16. The method for manufacturing an image pickup lens unit according to claim 1, wherein the positioning member includes a contact surface facing an inclined portion other than an effective region in the second optical surface of the lens.

17. The method for manufacturing an image pickup lens unit according to claim 1, wherein the positioning member includes a contact surface which faces the second optical surface of the lens and has substantially the same shape as the second optical surface.

18. The method for manufacturing an image pickup lens unit according to claim 1, wherein the lens is a single lens component, or a lens assembly which is an integrated combination of a plurality of lens elements.

19. The method for manufacturing an image pickup lens unit according to claim 1,
wherein the lens is a single lens component, or a lens assembly which is an integrated combination of a plurality of lens elements, and
the lens assembly is an integrated combination of a plurality lens elements and a stop interposed between the plurality of lens elements.

20. The method for manufacturing an image pickup lens unit according to claim 1, wherein the lens has quadrilateral prism-like side surfaces.

21. The method for manufacturing an image pickup lens unit according to claim 1, wherein a molding space for molding the lens is provided at a position different from the molding space for molding the holder member, in the mold.

22. The method for manufacturing an image pickup lens unit according to claim 1, wherein the holder member and the lens are formed with a reflow heat-resistant material.

23. The method for manufacturing an image pickup lens unit according to claim 1, wherein movement of the lens is prevented by sucking the lens from the mold side in a state of positioning the lens by the positioning member.

24. The method for manufacturing an image pickup lens unit according to claim 1, wherein the lens is formed of a resin material.

25. The method for manufacturing an image pickup lens unit according to claim 4, wherein the pressing of the lens is performed by the pressing member after performing the positioning of the lens by the positioning member.

26. The method for manufacturing an image pickup lens unit according to claim 4, wherein the positioning of the lens with respect to the mold is performed by bringing the positioning member in contact with a bending part of the second surface of the lens and pressing the positioning member towards the lens, in a state of bringing the first surface of the lens in contact with the pressing member.

27. An image pickup lens unit comprising:
a lens including a first surface which forms a first optical surface, and a second surface which forms a second optical surface on the opposite side to the first surface; and
a holder member which holds the lens in the inner portion in a state where the first and second optical surfaces are exposed,
wherein the lens has an inclined surface disposed at a position that is separated from an outer periphery of the lens and from one of the first optical surface and the second optical surface,
wherein the holder member is formed by integral molding, and is in intimate contact with the lens in the entire side surface of the lens, an edge portion of the first surface of the lens and an edge portion of the second surface of the lens, and wherein a portion of the lens between the inclined part and an edge portion of the holder is exposed.

28. The image pickup lens unit according to claim 27, wherein the holder member surrounds the periphery or vicinity of the first optical surface of the lens in a circular shape.

29. The image pickup lens unit according to claim 27, wherein the holder member surrounds the periphery or vicinity of the second optical surface of the lens in a circular shape.

30. The image pickup lens unit according to claim 27, wherein the lens is a single lens component or a lens assembly which is an integrated combination of a plurality of lens elements.

31. The image pickup lens unit according to claim 30, wherein the lens assembly is an integrated combination of a plurality of lens elements and a stop which is interposed between the plurality of lens elements.

32. The image pickup lens unit according to claim 27, wherein the lens has quadrilateral prism-like side surfaces.

33. The image pickup lens unit according to claim 27, wherein the holder member and the lens are formed with a reflow heat-resistant material.

34. The image pickup lens unit according to claim 27, wherein the lens is formed of a resin material.

35. The image pickup lens unit according to claim 34, wherein the lens is welded to the holder member.

36. The image pickup lens unit according to claim 27, wherein the lens is cut out from a lens wafer in which a plurality of lenses are arranged.

* * * * *